United States Patent [19]
Dames et al.

[11] Patent Number: 5,621,316
[45] Date of Patent: *Apr. 15, 1997

[54] APPARATUS FOR MEASURING THE POSITIONS OF PLURAL MOVABLE MEMBERS EACH ASSOCIATED WITH A RESPECTIVE MAGNETORESTRICTIVE ELEMENT

[75] Inventors: Andrew N. Dames, Cambridge; Peter J. Hyde, Newmarket, both of United Kingdom

[73] Assignee: Scientific Generics Limited, Cambridge, England

[*] Notice: The term of this patent shall not extend beyond the expiration date of Pat. No. 5,420,569.

[21] Appl. No.: 75,583

[22] PCT Filed: Jan. 3, 1992

[86] PCT No.: PCT/GB92/00012

§ 371 Date: Jun. 15, 1993

§ 102(e) Date: Jun. 15, 1993

[87] PCT Pub. No.: WO92/12401

PCT Pub. Date: Jul. 23, 1992

[30] Foreign Application Priority Data

| | | | |
|---|---|---|---|
| Jan. 4, 1991 | [GB] | United Kingdom | 9100172 |
| Feb. 5, 1991 | [GB] | United Kingdom | 9102475 |
| May 8, 1991 | [GB] | United Kingdom | 9109897 |
| Aug. 9, 1991 | [GB] | United Kingdom | 9117310 |
| Sep. 2, 1991 | [GB] | United Kingdom | 9118722 |
| Oct. 14, 1991 | [GB] | United Kingdom | 9121779 |

[51] Int. Cl.$^6$ .............................. G01B 7/14; G01D 5/48; G01F 15/06
[52] U.S. Cl. ................................ 324/207.13; 324/207.22
[58] Field of Search ..................... 324/207.11, 207.22, 324/207.24, 207.13, 157; 340/551, 572

[56] References Cited

U.S. PATENT DOCUMENTS

| | | |
|---|---|---|
| 1,967,100 | 7/1934 | Pratt . |
| 3,857,089 | 12/1974 | Adler et al. . |
| 4,005,396 | 1/1977 | Fujiwara et al. . |
| 4,037,219 | 7/1977 | Lewis . |
| 4,224,603 | 9/1980 | Lallemand . |
| 4,401,986 | 8/1983 | Trenkler et al. . |
| 4,504,832 | 3/1985 | Conte . |
| 4,507,639 | 3/1985 | Trenkler et al. . |
| 4,527,120 | 7/1985 | Kurosawa . |
| 4,584,577 | 4/1986 | Temple . |
| 4,608,564 | 8/1986 | Hoffman ............................... 324/157 |
| 4,723,446 | 2/1988 | Saito et al. . |
| 4,833,919 | 5/1989 | Saito et al. . |
| 4,893,077 | 1/1990 | Auchterlonie . |
| 4,928,089 | 5/1990 | Gasiunas et al. . |
| 4,994,799 | 2/1991 | Levigion . |
| 5,420,569 | 5/1995 | Dames et al. ......................... 340/572 |

FOREIGN PATENT DOCUMENTS

| | | |
|---|---|---|
| 0240707 | 3/1987 | European Pat. Off. . |
| 0369493 | 12/1989 | European Pat. Off. . |
| 2-261575 | 10/1990 | Japan . |
| 1167421A | 10/1985 | U.S.S.R. . |
| 2016694 | 9/1979 | United Kingdom . |
| 2217849 | 2/1989 | United Kingdom . |

*Primary Examiner*—Walter E. Snow
*Attorney, Agent, or Firm*—Nixon & Vanderhye P.C.

[57] ABSTRACT

Apparatus for indicating the value of a variable comprising first and second members moveable relative to each other as a function of said variable, a plurality of elements of a first type on one of said members, at least one element of a second type on the other of said members, one of said types being magnetostrictive and the other being operative to produce a magnetic bias field, said elements being arranged so that as said first and second members move relative to each other different ones of said plurality of elements of said first type magnetically interact with said at least one element of said second type such that, for different positions of said members, said interaction causes magnetostrictive resonance at different frequencies in response to an alternating interrogating magnetic field at said different frequencies.

14 Claims, 29 Drawing Sheets

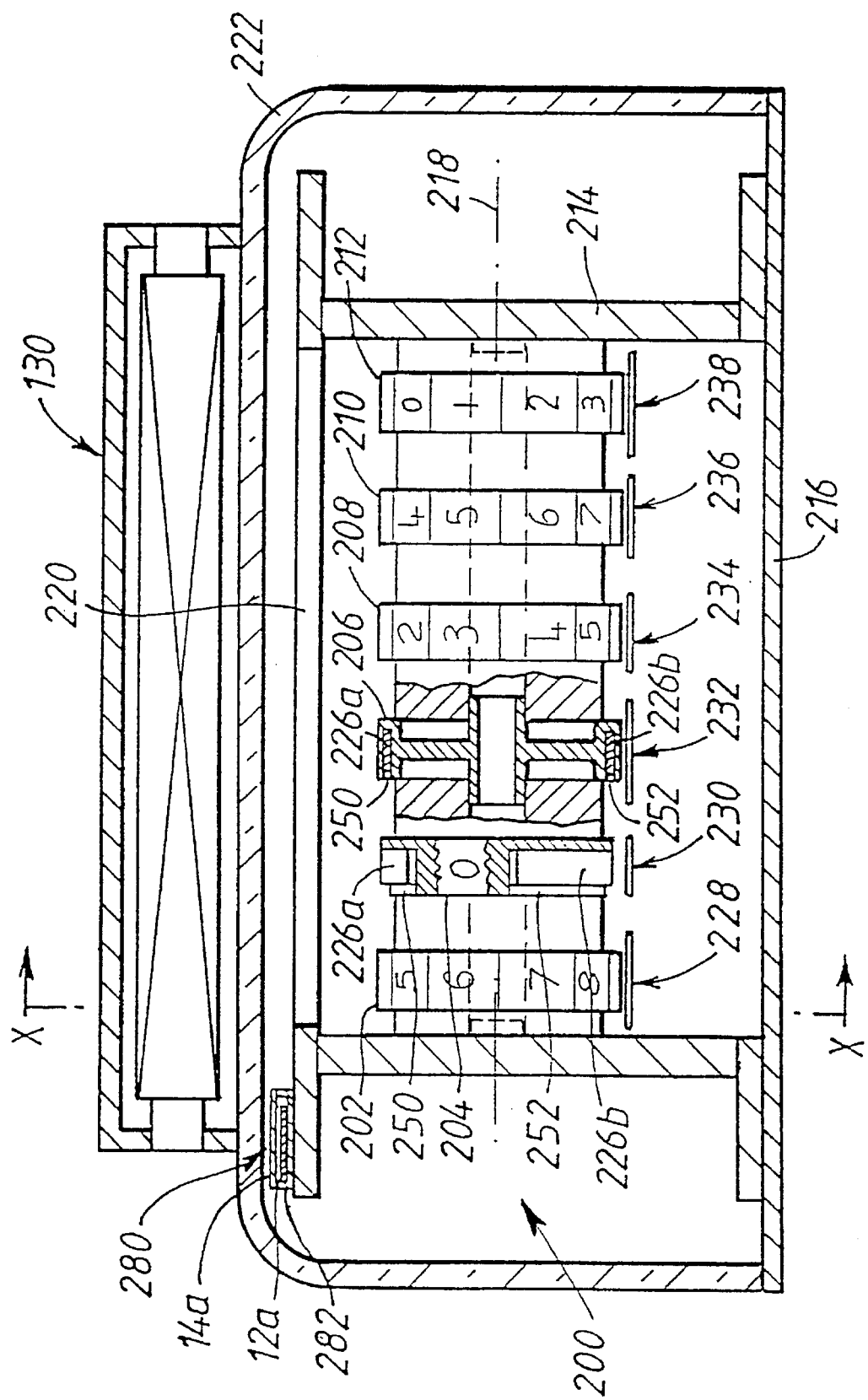

| POSITION | PATTERN FROM RESONATOR 310 | PATTERN FROM RESONATOR 310' |
|---|---|---|
| A | ⋏ | ⋏⋏⋏ |
| B | ⋏⋏⋏ | ⋏⋏ |
| C | ⋏⋏ | ⋏⋏⋏ |
| D | ⋏⋏⋏ | ⋏ |
| E | ⋏ | ⋏⋏⋏ |
| F | ⋏⋏⋏ | ⋏⋏ |

Fig. 47
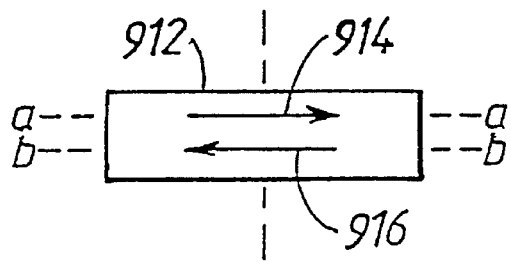
Fig. 49
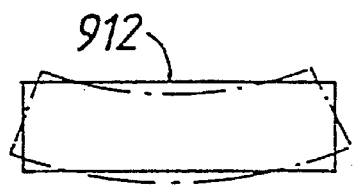
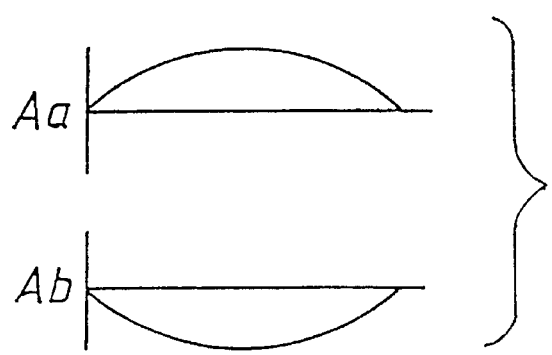
Fig. 48
Fig. 50
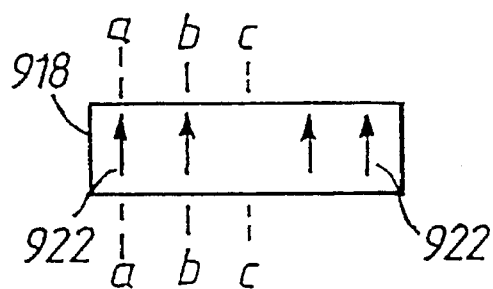
Fig. 52
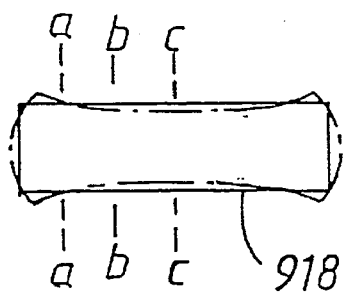
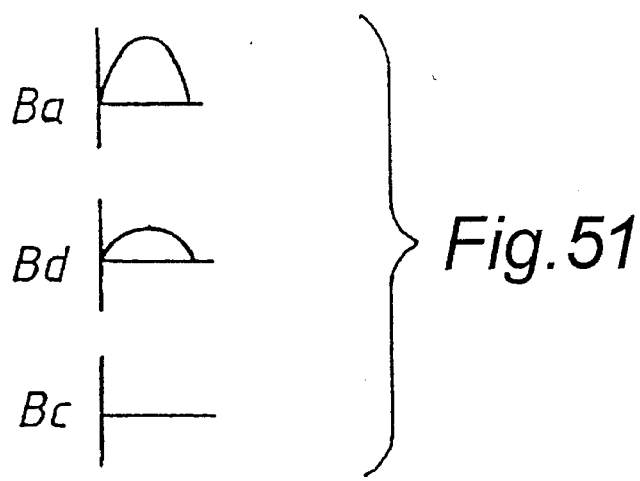
Fig. 51

APPARATUS FOR MEASURING THE POSITIONS OF PLURAL MOVABLE MEMBERS EACH ASSOCIATED WITH A RESPECTIVE MAGNETORESTRICTIVE ELEMENT

RELATED APPLICATION/PATENT

This invention is related to our application Ser. No. 08/075,582 filed Jun. 15, 1993 now issued U.S. Pat. No. 5,420,569 (based on PCT/GB 92/00014 filed Jan. 3, 1992 and designating the United States).

BACKGROUND OF THE INVENTION

1. Field of the Invention

The invention relates to devices and apparatus for indicating a variable such as the position of a movable member. For example, the invention may be applied to the determination of the position of the dials in a meter such as a water or gas meter or to linear or to rotary encoders.

2. Related Art

The prior art contains a large number of devices and proposals for measuring the relative positions of two members. One proposal, as disclosed in European Patent Application Nos. 240707 and 369493, involves providing a magnet on one of the members and an array of magnetically sensitive resistors on the other, that is to say resistors whose resistance changes in response to the application of a magnetic field thereto. The arrangement is such that as the two members move relative to each other, the magnet moves over the array of resistors. Position is determined by a measuring circuit connected to the array of resistors and operative to detect which resistor has its resistance affected by the magnetic field created by the magnet. The problem with this proposal is that electrical circuitry has to be physically connected to all of the resistors in order to determine the relative positions of the two members. Such circuitry is therefore relatively complex and expensive.

Another proposal, as disclosed in UK Patent Application No. 2016694, employs a magnetostrictive rod effectively operating as an ultrasonic delay line. The rod is attached to one of the movable members and an electrical transmitter coil surrounding the rod and moveable therealong is attached to the other. Application of an alternating pulse to the electrical coil will create an alternating field which will set up an ultrasonic wave in the magnetostrictive rod. Pick up coils are positioned at each end of the rod and connected to an electrical circuit for determining the difference in time of arrival of the ultrasonic wave at the two ends of the rod. This time difference is indicative of the position of the moveable coil with respect to the length of the rod. This proposal again requires electrical circuitry connected to both the transmitter and the pick up coils for determining relative position.

In a further proposal, disclosed in U.S. Pat. No. 4,710,709, one of the relatively moveable members carries two overlapping electrical coils and the other a bar which is moveable axially through the coils and includes a cavity containing a magneto strictive element which is free to vibrate mechanically within the cavity. The first mentioned member also carries means for generating a DC bias magnetic field to which the magnetostrictive element is subjected. As the bar moves through the coils, the strength of the DC bias field on the magnetostrictive element varies and causes the Young's modulus of the element and therefore its resonant frequency to vary also. Change in resonant frequency is therefore a measure of change in position and is detected by applying an interrogating field to the magnetostrictive element by energizing one of the overlapping coils with a signal of appropriate frequency, which may be swept through the range of frequencies at which the magnetostrictive element may resonate. Upon resonance, the magnetostrictive element generates an alternating magnetic field at its resonant frequency, which is detected by the second of the overlapping coils. The problem with this proposal is that the range of displacements which may be detected is limited by the distance through which the magnetostrictive element may move relative to the DC field generating means to produce a detectable variation in resonant frequency.

SUMMARY OF THE INVENTION

With a view to overcoming or alleviating the above problems, one aspect of the present invention comprises first and second relatively moveable members, a number of magnetostrictive elements on one of the members and adapted to resonate at respective different frequencies, and means on the other of said members for producing a magnetic biasing field such that different said magneto strictive elements are subjected to said biasing field dependent upon the relative position of the first and second members. The biasing field is such that the magnetostrictive elements subjected thereto will mechanically resonate in response to an interrogating AC magnetic field of appropriate frequency and thus produce a detectable AC magnetic field. Since the magnetostrictive elements resonate at different frequencies, the detected frequency will be indicative of the relative position of the first and second members. In a preferred form, the biasing means is such that different combinations of said magneto strictive elements are biased dependent upon the relative positions of the first and second members according to a predetermined code and thus the different combinations of frequencies produced by the interrogating field will be indicative of the relative positions of the first and second members.

In accordance with an alternative embodiment, position detecting apparatus comprises first and second relatively moveable members, a magnetostrictive element on one of the members, and magnetic biasing means on the other of the members, the magnetic biasing means being operable to produce different DC magnetic field patterns on said magnetostrictive element in dependence upon the relative position of the two members, said field patterns biasing said magnetostrictive element to resonate at one or more of its fundamental frequency and harmonics thereof in response to an applied interrogating AC field of appropriate frequency.

In a further aspect, the invention provides a remotely readable indicator comprising magneto strictive means, means for producing a magnetic field for biasing the magnetostrictive means and means for varying the relationship between the magnetostrictive means and the biasing field and/or for varying the bias field as a function of a variable or quantity to be measured or indicated so that the magnetostrictive means is responsive to interrogating alternating fields of different discrete frequencies dependent upon the value of the variable or quantity.

BRIEF DESCRIPTION OF THE DRAWINGS

The invention is described further, by way of example, with reference to the accompanying drawings in which:

FIG. 23 is a partial side view, partially in section, showing a further embodiment of the invention;

FIGS. 47 to 52 are diagrams illustrating the creation of different modes of vibration in the magnetostrictive element.

DETAILED DESCRIPTION OF EXEMPLARY EMBODIMENTS

Electromagnetic/Magnetostrictive Principles

Figure 1:
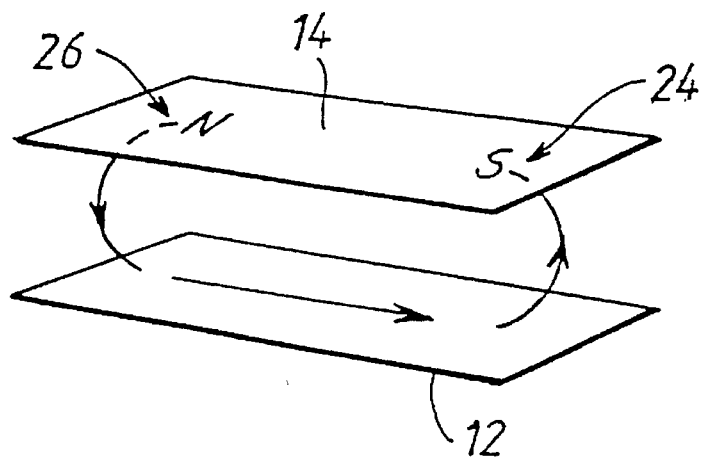
FIGS. 1 to 9 are diagrams for illustrating the electromagnetic/magnetostrictive principles utilized in the preferred embodiments of the invention.

FIG. 1 shows a magnetostrictive element 12 in the form of a strip of magnetostrictive material disposed adjacent a rectangular plate 14 of hard material magnetized to act as a magnetic biasing element for the magnetostrictive strip 14. Thus, the plate 14 has south and north poles 24, 26 respectively at each end and produces a magnetic field to which the element 12 is subjected as indicated by the arrows.

Figure 2A:
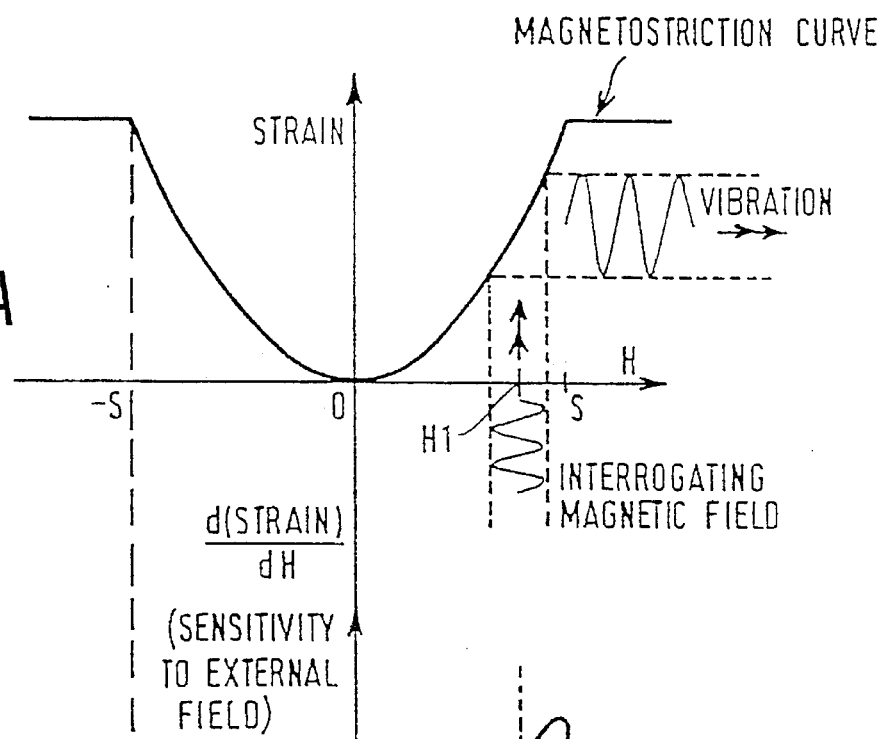
Figure 2B:
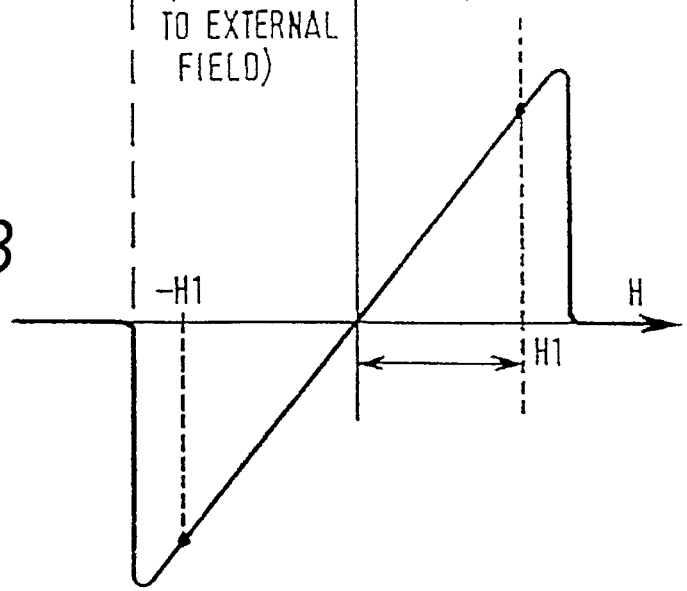

As is known, with the biasing element 14 magnetised in the same way as a simple bar magnet, i.e a north pole at one end and a south pole at the other as illustrated in FIG. 1, the magnetostrictive element 12 would be stressed by the resulting magnetic field in such a way that if the element 12 were subjected to an external interrogating alternating magnetic field at a frequency equal to the natural frequency of the element 12, that element would mechanically vibrate and produce a detectable regenerated alternating magnetic field having the same frequency. This effect can be understood from consideration of FIG. 2 which comprises two curves illustrating the way in which the sensitivity of the element 12 to the applied interrogating field varies as a function of the strength of the biasing field produced in the strip 12 by the magnetisation of the biasing element 14. In FIG. 2, curve A is a plot of the strain produced in a magnetostrictive element against field H applied to the element. Thus, at the origin, where the field H is zero, there is no strain. If the field H is increased to a value S or -S, the magnetostrictive element becomes saturated and further increase in the field (in either direction) does not produce any further strain. Curve B shows that the sensitivity of the device to the applied field increases linearly with increasing strength of the bias field H and thus the strength of the magnetism applied to the element 12 is chosen to provide a biasing field towards the upper end of the sensitivity curve. For example the fields represented by arrows 28 in FIG. 1 might have a value H1 or -H1 as shown in FIG. 2.

Figure 3:
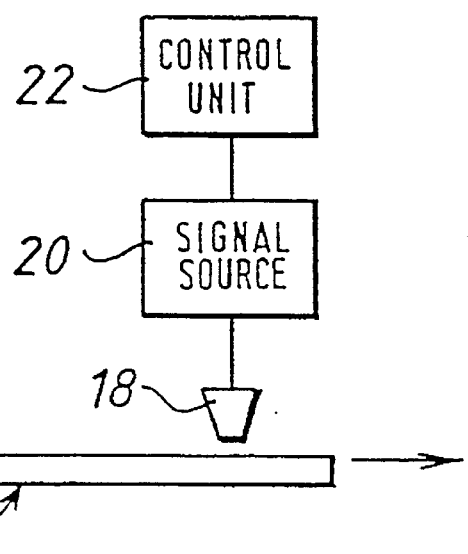

With the simple pattern of magnetization in element 14 shown in FIG. 1 i.e. a north pole at one end and a south pole at the other end, element 12 will resonate at its fundamental or natural frequency, as already explained, in response to an applied interrogating field at that frequency and this phenomenon, as will be described later, is utilized in certain embodiments of the invention. In other embodiments of the invention, as will also be described later, a magnetostrictive element is caused to resonate at one or more of the harmonics of its natural or fundamental frequency in response to interrogating fields having frequencies equal to such harmonics. To achieve this resonance, more complex magnetic patterns than that shown in FIG. 1 are provided in the biasing element 14. Such patterns may, as shown in FIG. 3, be recorded in the biasing element 14 by transporting it past but in close proximity to a magnetic recording head 18 of conventional type, as shown by the arrow. As the element 14 is transported past the recording head 18, a signal generator 20, controlled by a control unit 22, energises the recording head 18 with a signal whose waveform is selected to produce the required magnetic pattern in the biasing element 14.

Figure 4:
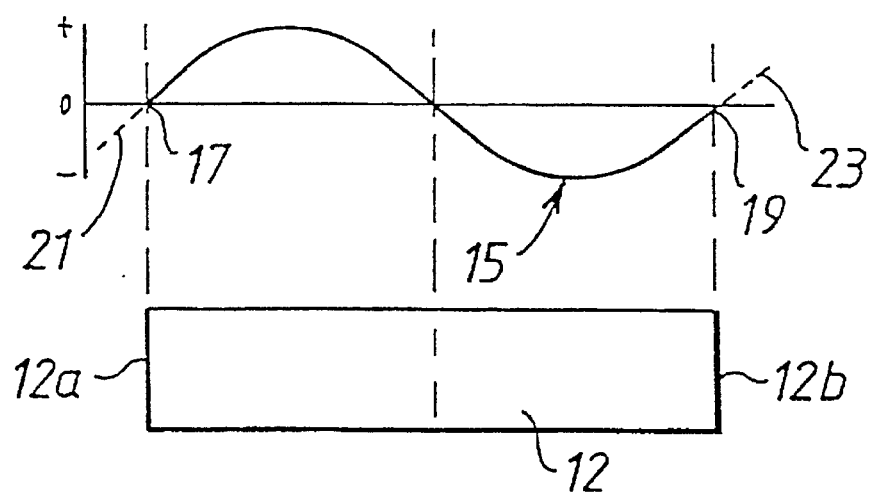

FIG. 4 illustrates an example of a waveform for application to the head 18 for storing a magnetic pattern in the element 14 which will bias the magnetostrictive element 12 in such a way that it will resonate at a frequency of twice its natural or fundamental frequency in response to an applied interrogating alternating field also having a frequency of twice the natural or fundamental frequency of the strip 12. As can be seen in FIG. 4, the waveform is a sine wave 15 whose frequency and phase relative to the movement of the element 14 past the recording head 18 are chosen so that, when the elements 12 and 14 are positioned as shown in FIG. 1, a single cycle of the sine wave as recorded in element 14 coincides with the length of the magnetostrictive element 12 with the zero crossing points 17 and 19 of the sine wave substantially coincident with the ends 12a and 12b of the element 12. In the recording process, the signal source 20 is turned on prior to arrival of the element 14 beneath recording head 18 and is turned off after the element 14 has passed the recording head 18 so as to avoid the generation of transients in the recording thereof in the element 14, which may arise if the signal source 20 were turned on and off at the zero crossing points 17 and 19. This process is illustrated by dotted line portions 21 and 23 of the sine wave 15 in FIG. 4.

Figure 5:
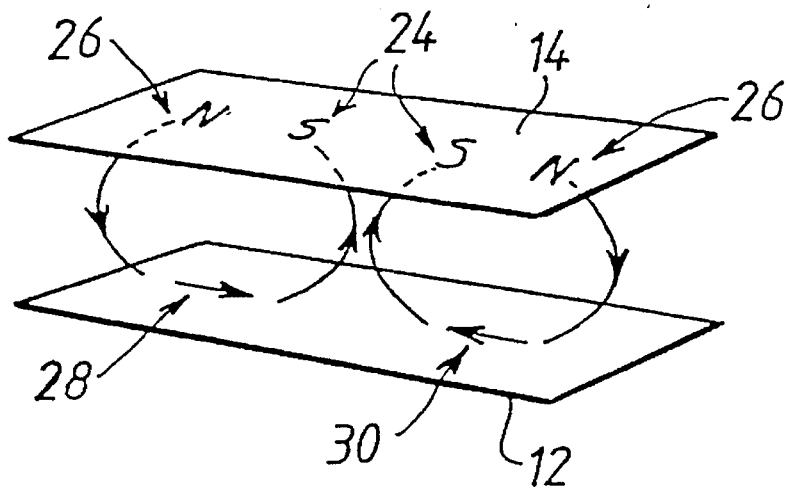

As can be seen in FIG. 5, the resulting magnetic pattern in element 14 comprises south pole regions 24 near to the centre of the strip and north pole regions 26 towards the ends of the strip 14. Arrows 28 and 30 in FIG. 5 indicate the magnetic lines of force arising from the above described magnetic pattern recorded in element 14 and, as shown, by the direction of these arrows, the resulting field with which the magnetostrictive element 12 is biased is directed to the right in the left hand portion of the strip 12 and to the left in the right hand portion. Accordingly, when the element 14 is subjected to an interrogating alternating magnetic field of twice the natural frequency of the strip 12, the two halves thereof will resonate in phase opposition to each other at a frequency equal to twice the natural frequency. Such resonance, which is a mechanical vibration, will produce a detectable regenerated magnetic field at twice the natural frequency of the strip 12.

Figure 6:
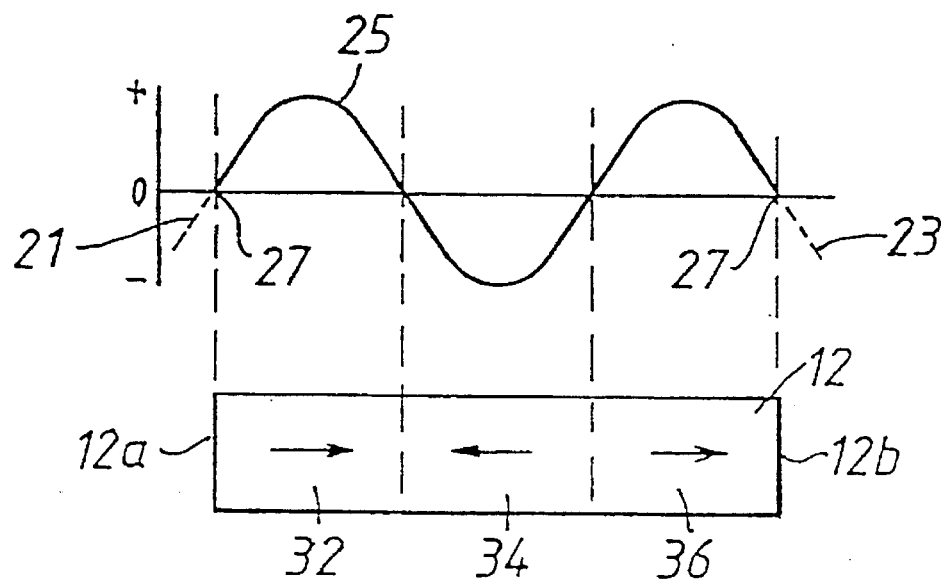

If it were desired to cause the magnetostrictive element 12 to resonate at a frequency of three times its natural frequency in response to an applied interrogating field of corresponding frequency, the waveform shown in FIG. 6 may be used when performing the programming illustrated in FIG. 3. As shown in FIG. 6, the sine signal 25 applied to the recording head 18 as the element 14 is moved therepast is at a frequency and phase relative to the movement of the element 14 such that one and a half cycles of the sine wave applied to recording head 18 correspond substantially to the length of the strip 12 with zero crossing points 27 substantially coincident with the ends of the strip 12. As in the embodiment of FIG. 4, the sine signal 25 is turned on prior to arrival of the element 14 beneath the recording head 18 and off subsequent to the departure of the element 14 from beneath the recording head 18 for the same reasons.

The magnetic field produced in the strip 12 by the element 14 with the signal 25 recorded thereon comprises three portions 32, 34 and 36. The portion 32 in the left hand one third of the element 12 is directed to the right, the portion 34 in the centre one third of the element 12 is directed to the left and the portion 36 in the right hand one third of the element 12 is directed to the right. Such strip will, accordingly, resonate at three times its natural frequency in response to an applied alternating magnetic field having a frequency three times the natural frequency of the strip. Such resonance, which is a mechanical vibration, will produce a detectable regenerated magnetic field at three times the natural frequency.

Figure 7:
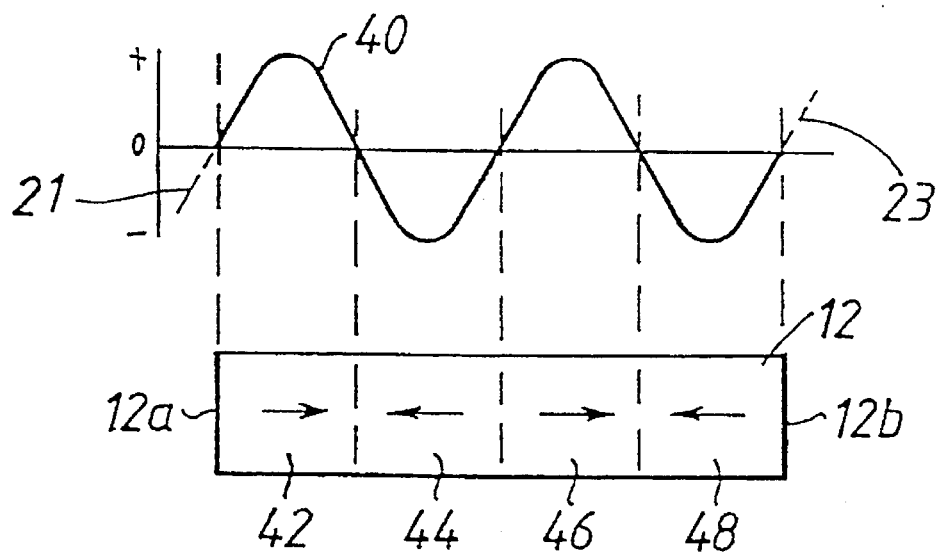

FIG. 7, which is similar to FIG. 6, shows at 40 a sine wave which may be applied to the recording head 18 to produce resonance at four times the natural frequency of the magnetostrictive element 12. The frequency of the signal applied to the recording head 18 is such that two full cycles of sine wave are recorded in element 14 with zero crossings arranged as previously described and the recording of transients being avoided as previously described. As shown at 42, 44, 46 and 48, the resulting biasing magnetic field pattern to which the strip 12 is subjected comprises four zones in which the direction of the field reverses form one zone to the next. Thus, the strip will resonate mechanically in response to an applied interrogating magnetic field of four times the natural frequency of the strip, the frequency of resonation being four times the natural frequency of the strip. Again, this produces a detectable regenerated field at four times the natural frequency of the strip.

Figure 8:
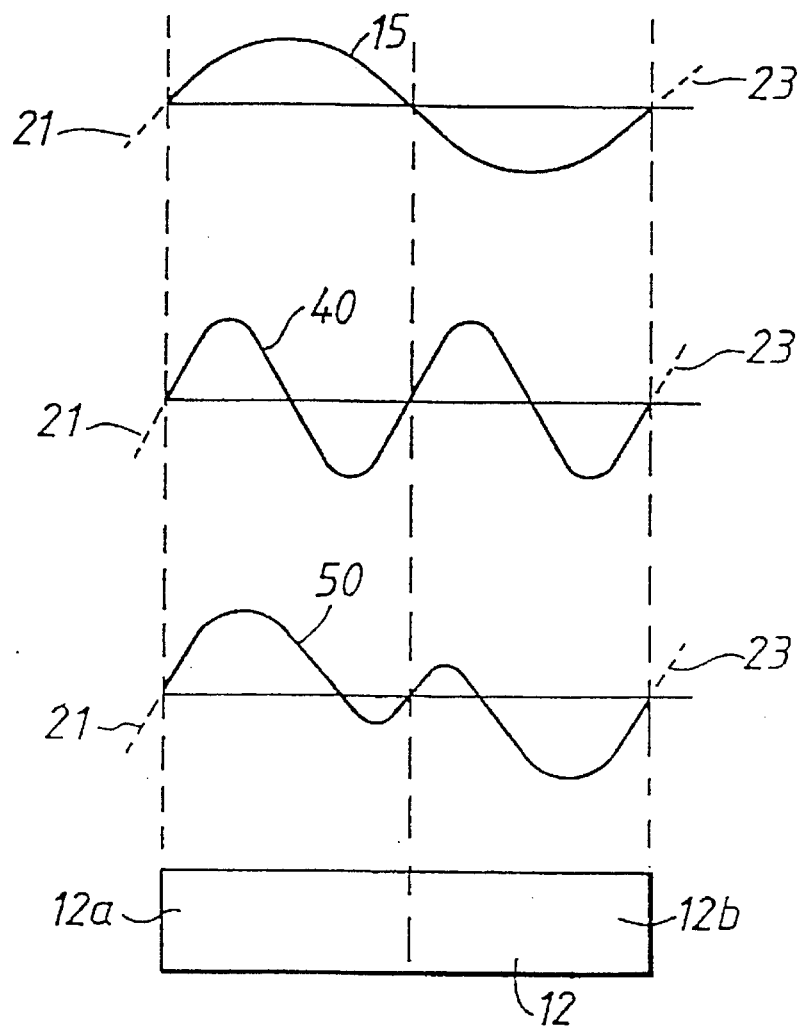

The element 14 can be programmed so that the magnetostrictive element 12 will resonate at higher harmonics by correspondingly adjusting the signal recorded by the recording head 18. Further, although up to this point, description has been given of how to cause resonance at only a single frequency which is a harmonic of its fundamental frequency, it is possible to program the element 14 so that the magnetostrictive element 12 will be capable of resonating in response to each of a number of interrogating frequencies. Such frequencies may comprise the fundamental and one or more harmonics or the fundamental may be omitted, as desired. This is simply achieved by recording a magnetic pattern on the strip 14 which represents the superposition of the magnetic patterns necessary for each of the individual frequencies required. An example of this is shown in FIG. 8 which shows at 50 a waveform for recording on the strip 14 to cause resonance of the magnetostrictive element 12 at both twice and four times the fundamental frequency. The waveform 50 is derived by simply adding waveforms 15 and 40 which are respectively the same as the waveforms shown in FIGS. 4 and 7.

Although FIG. 8 illustrates encoding for resonance at two harmonics, it is possible to encode for resonance at more than two harmonics simply by adding together the waveforms for the required harmonics, or to encode for resonance at the natural frequency of the element 12 plus one or more harmonics by adding together the waveform required for the fundamental (which would be half a cycle of sine wave with the zero crossing points substantially coincident with the ends 12a, 12b of the strip 12) and that required for each desired harmonic. The amplitude of the resonance produced at different frequencies is a function, inter alia, of the amplitude of the signal recorded on the element 14 to produce the resonance. Accordingly, the recorded signals for producing different resonances may have different amplitudes to compensate for other factors in the system such as the fact that the amplitude of the resonance at higher harmonics tends naturally to be less than that at lower harmonics. Examples of other factors which may be compensated for in this way are noise, receiver sensitivity at different frequencies, differing interrogation field strengths at different frequencies etc.

Figure 9:
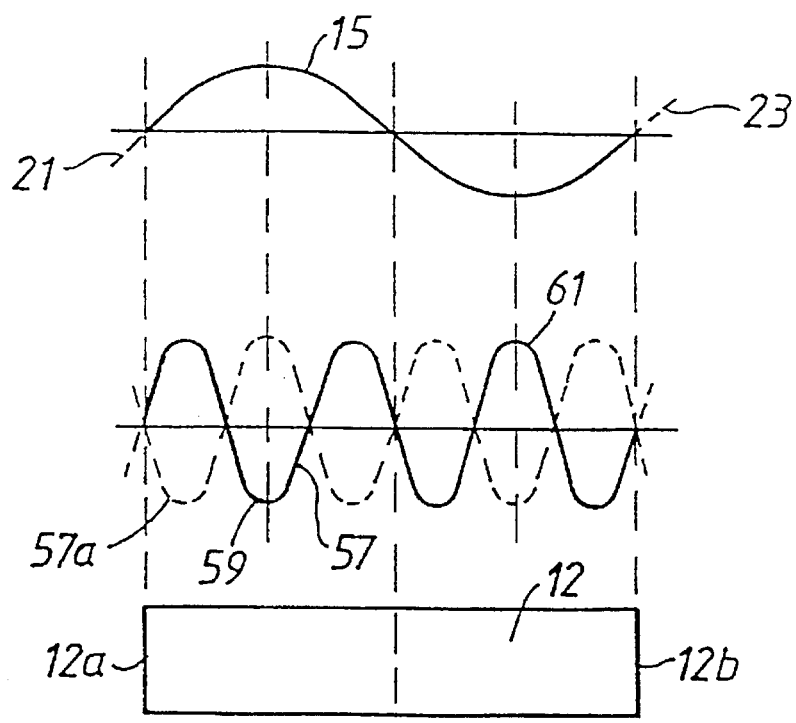

When adding together waveforms to obtain resonance at a number of different frequencies, the amplitude and phase relationships between the signals to be added should be selected to avoid saturation of the magnetostrictive element 12. An example of how this may be achieved is shown in FIG. 9 in which waveform 15 (which is the same as previously described) is to be added to a waveform 57 which, as will be appreciated from consideration of FIG. 9, will provide resonance at six times the natural frequency of the strip 12. The preferred phase of waveform 57 is shown in full lines in FIG. 9 and it is seen that the peaks 59 and 61 which are coincident with the peaks of waveform 15 are of opposite sign to the corresponding peaks in waveform 15, thus avoiding addition of the peaks of the two waves. A broken line wave shown at 57a in FIG. 9 is the inversion of waveform 57 and its phase is thus such that its peaks would add to the peaks of waveform 15. In those circumstances, the amplitudes of the two waves would have to be kept to a lower level than where waveform 57 is used if saturation of the magnetostrictive strip 12 is to be avoided.

Embodiments of the Invention

A number of embodiments of the invention in meters, such as gas or water meters, for the reading of the positions of the dials thereof will now be described with reference to FIGS. 10 to 29. In the embodiments of FIGS. 10 to 23, dial positions are indicated by causing magnetostrictive elements to resonate at harmonics of their fundamental frequency in accordance with the principles explained above with reference to FIGS. 4 to 9. In the embodiments of FIGS. 24 to 29, a number of magnetostrictive elements are provided each having a different fundamental frequency, and these are caused to resonate in different combinations at their respective fundamental frequencies for indicating dial position.

Figure 10:
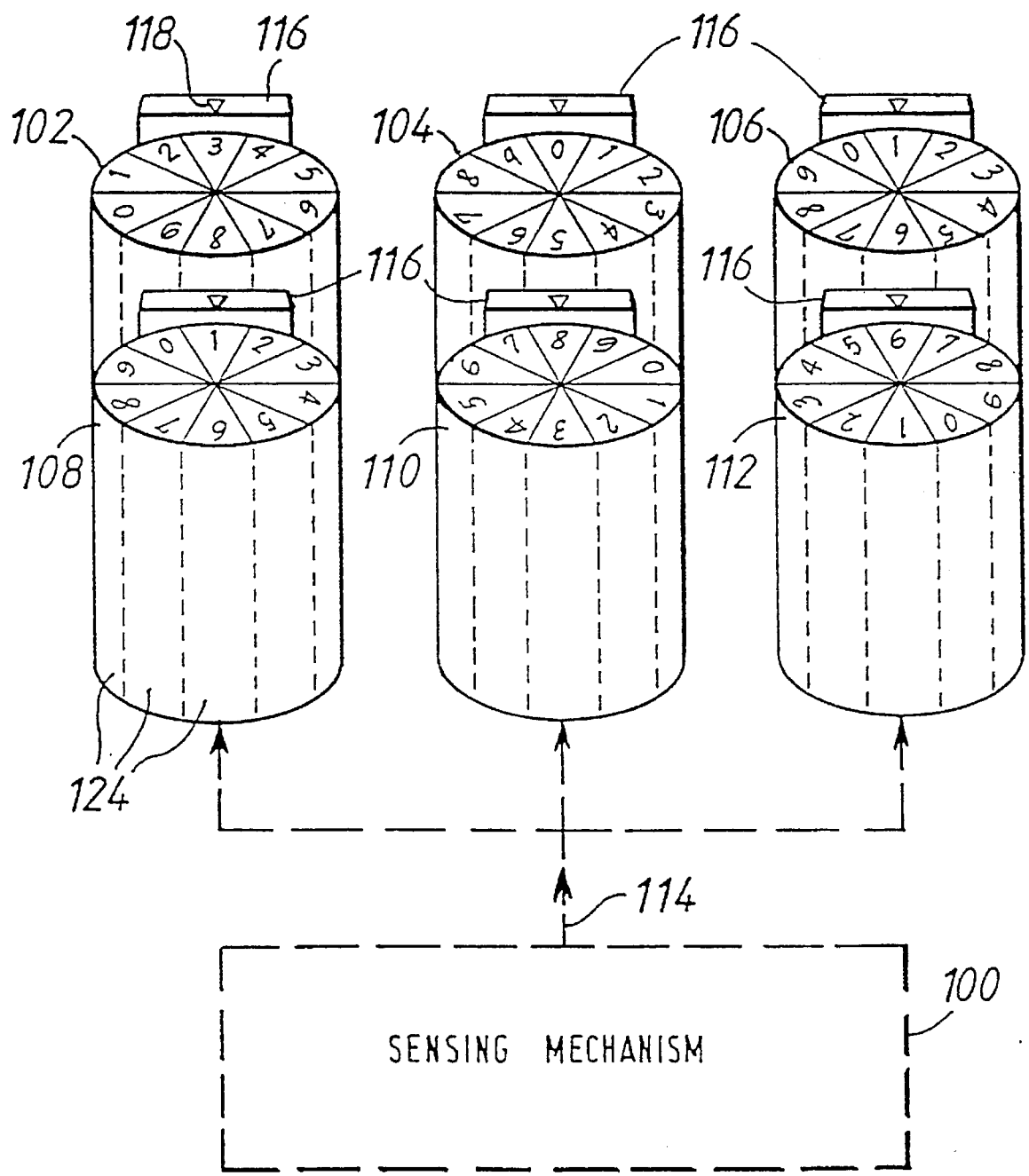
FIG. 10 diagrammatically illustrates a remotely readable meter, such as a gas meter, comprising six dials, according to an embodiment of the invention.

FIGS. 10 to 15 illustrate a remotely readable meter 101 in which the invention is embodied. As shown in FIG. 10, the meter comprises a conventional sensing mechanism 100 (not shown in detail) for example for sensing gas or water flow, and six dials 102, 104, 106, 108, 110 and 112 driven by the sensing mechanism through a conventional linkage which is not shown but is diagrammatically respresented by broken lines 114. As can be seen in FIG. 10, each of the dials 102 to 112 is marked with the digits 0 to 9 around its face and a casing 116 positioned adjacent to each dial bears a mark 118 indicating the current value represented by the rotary position of the dial. As is conventional, the six dials represent respectively the digits of a six digit number and are mounted rotatably in a housing (not shown) to which the casings 116 are also attached.

Figure 11:
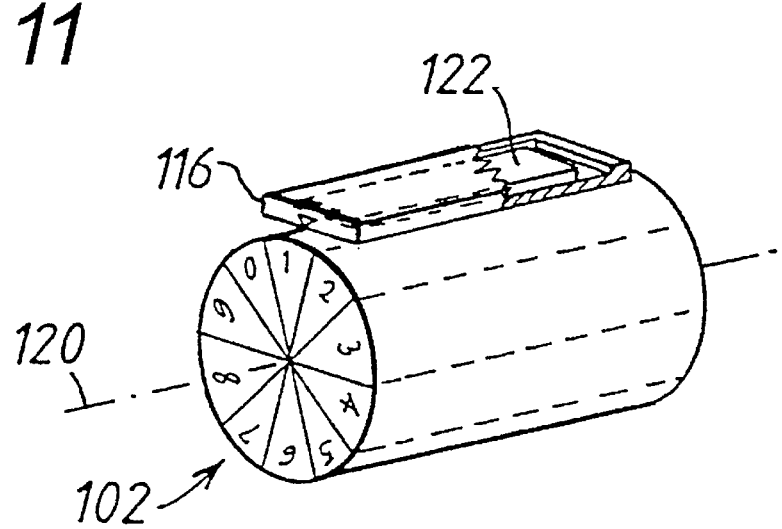
FIG. 11 is a perspective view of a dial of the meter of FIG. 10 showing more detail.

The dial 102 and casing 116 are shown in perspective in FIG. 11 and as can be seen the casing 116 is rectangular and is parallel to the rotary axis 120 of the dial and is substantially co-extensive with the axial length of the dial. The casing 116 contains a rectangular magnetostrictive strip element 122 which is similar to the element 12 of FIG. 1 and is contained within a rectangular cavity inside casing 116 with clearance so that the element 122 may mechanically vibrate. The casing 116 is wholly made of a magnetically transparent material, such as a synthetic plastics material.

Figure 12:
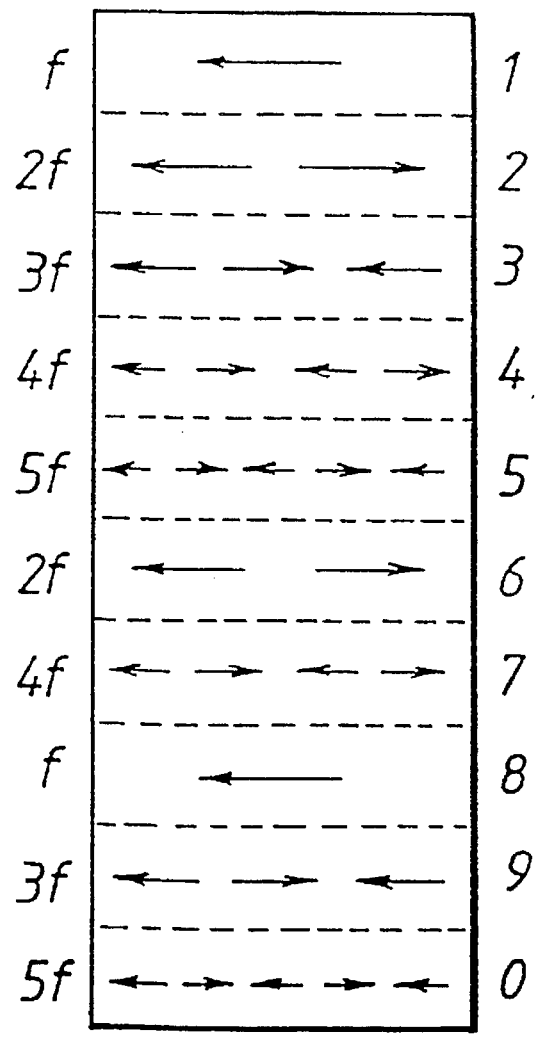
FIG. 12 illustrates by way of example, patterns of magnetisation which may be provided on the dials of FIG. 10 in accordance with an aspect of the invention.
Figure 13A:
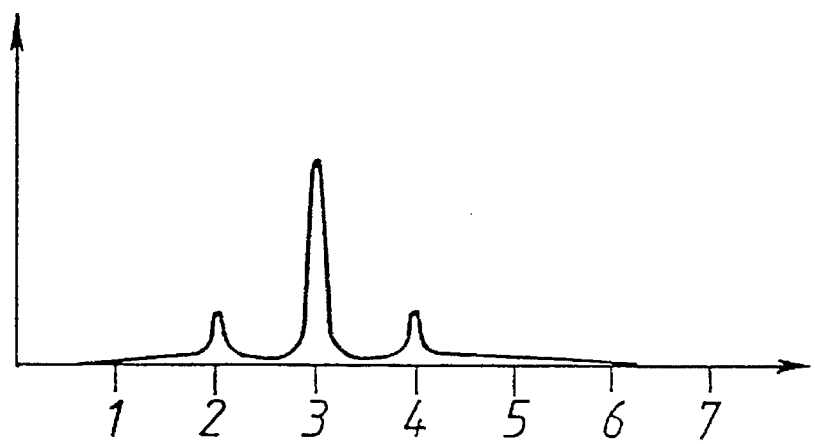
FIG. 13 illustrates graphically examples of responses which may be obtained from a given dial of FIG. 10 as the dial rotates to different successive positions.
Figure 13B:
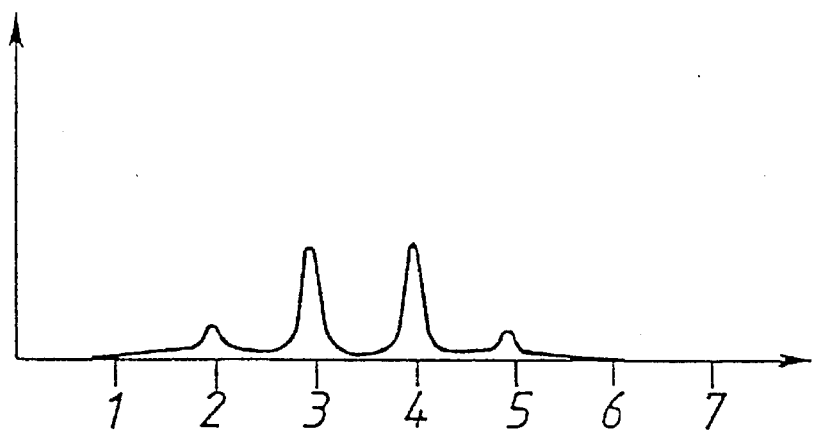
Figure 13C:
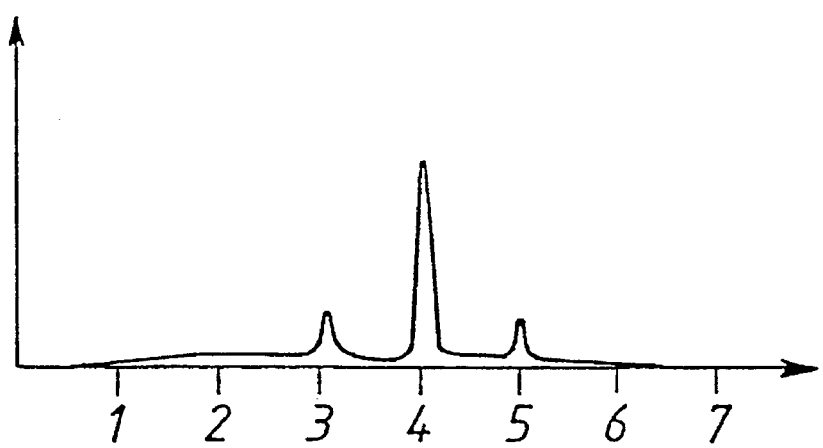

As is clear from FIGS. 10 and 11, each dial 102 to 112 is in the form of a drum. Strips 124 (similar to the element 14 of FIG. 1) of hard magnetic material are attached to the periphery of the drum and extend longitudinally thereof. Each strip 124 is aligned with a corresponding number on the face of the dial and has recorded thereon a pattern of magnetism which is such that when a given strip is adjacent to the housing 116, the resulting magnetic field pattern will bias the strip 122 such that it will resonate at a particular frequency. FIG. 12 illustrates examples of the magentic field patterns which may be produced by the respective different strips 124. Thus, the strip 124 adjacent the number "1" on the dial produces a magnetic pattern which will cause the magnetostrictive element 122 to resonate at its fundamental or natural frequency f in response to an interrogating field having a frequency f. Similarly, the strips 124 adjacent the numbers 2 to 5 on the dial have magnetic patterns recorded in them which are such that the magnetostrictive element 122 will resonate at frequencies 2f to 5f in response to interrogating fields of frequencies 2f to 5f respectively. As shown in FIG. 12, the magnetic field patterns associated with the numbers 6 to 9 and 0 are also such as to produce resonances within the range f to 5f. However, as represented in FIG. 12, the width of the magnetostrictive element 122 is greater than the width of each strip 124 and thus the magnetostrictive element 122 is always influenced by either two or three of the strips 124. Thus, although the magnetostrictive element 122 is resonant at 4f both at dial position number 4 and dial position number 7, for example, it will when at position number 4 also resonate at 3f and 5f whereas when at position number 7 it will resonate also at 2f and f. In this way, position 4 and position 7 can be distinguished from each other. This is further illustrated in FIG. 13 which shows the resonances produced as the dial moves from position 3 to position 4. Thus, curve A in FIG. 13 illustrates the resonances produced at position 3, these being 3f with high amplitude and 2f and 4f with relatively low amplitude. Curve B in FIG. 13 illustrates the resonances produced as the dial is approximately half way between positions 3 and 4, i.e. approximately equal amplitude resonances at 3f and 4f are produced whereas there are low amplitude resonances at 2f and 5f. Curve C in FIG. 13 illustrates the resonances produced when the dial is at position 4, namely high amplitude resonance at 4f and approximately equal but low amplitude resonances at 3f and 5f. As will now be clear, the coding arrangement for the digits shown on the dial is as follows:

TABLE 1

| DIGIT | RESONANT FREQUENCIES |
|---|---|
| 0 | 3f, 5f, f |
| 1 | 5f, f, 2f |
| 2 | f, 2f, 3f |
| 3 | 2f, 3f, 4f |
| 4 | 3f, 4f, 5f |
| 5 | 4f, 5f, 2f |
| 6 | 5f, 2f, 4f |
| 7 | 2f, 4f, f |
| 8 | 4f, f, 3f |
| 9 | f, 3f, 5f |

In the above table f is the natural frequency of the magnetostrictive strip. This type of coding arrangement has the advantage that the number of frequencies used at each dial is minimised.

Figure 14:
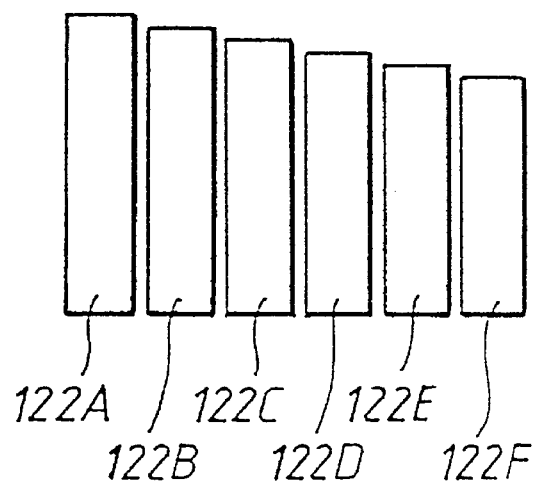
FIG. 14 illustrates the size relationship between respective different resonant strips associated with respective different ones of the dials in the meter of FIG. 10.

Thus, to interrogate the dials, an interrogating alternating magnetic field is applied and the frequency thereof is swept through the required range of frequencies. So that one dial can be distinguished from another, the lengths of the magnetostrictive strips adjacent the respective different dials are different as illustrated in FIG. 14. Thus, strips 122A to 122F correspond respectively to dials 102 to 112 and each has a different fundamental frequency and therefore a different set of harmonics.

Figure 15:
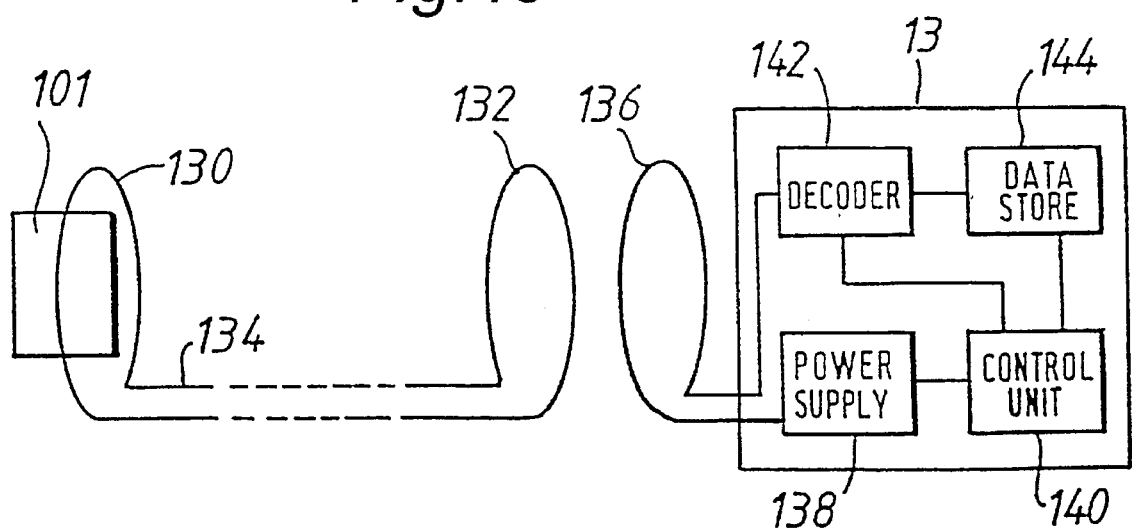
FIG. 15 is a diagram illustrating an arrangement for remotely reading the meter of FIGS. 10 to 14.

FIG. 15 shows an interrogation arrangement for the meter 101. This comprises a first coil 130 positioned adjacent the meter, a second coil 132 remote from the meter but connected to the coil 130 by simple electrical conductors 134 and a portable reading device 13, which may be carried by the person whose job it is to read the meter. Device 13 comprises a transmitting and receiving coil 136, a power supply 138 therefor, a control unit 140 for driving the power supply to cause the coil 136 to produce an alternating magnetic field whose frequency is swept or stepped through the range of frequencies (including the harmonics) at which the magnetostrictive elements 122 may resonate, a decoder 142 for decoding the detected regenerated fields and a data store 144 into which data read from each meter is stored, together with the identity of the meter, under control of the control unit 140.

Figure 16:
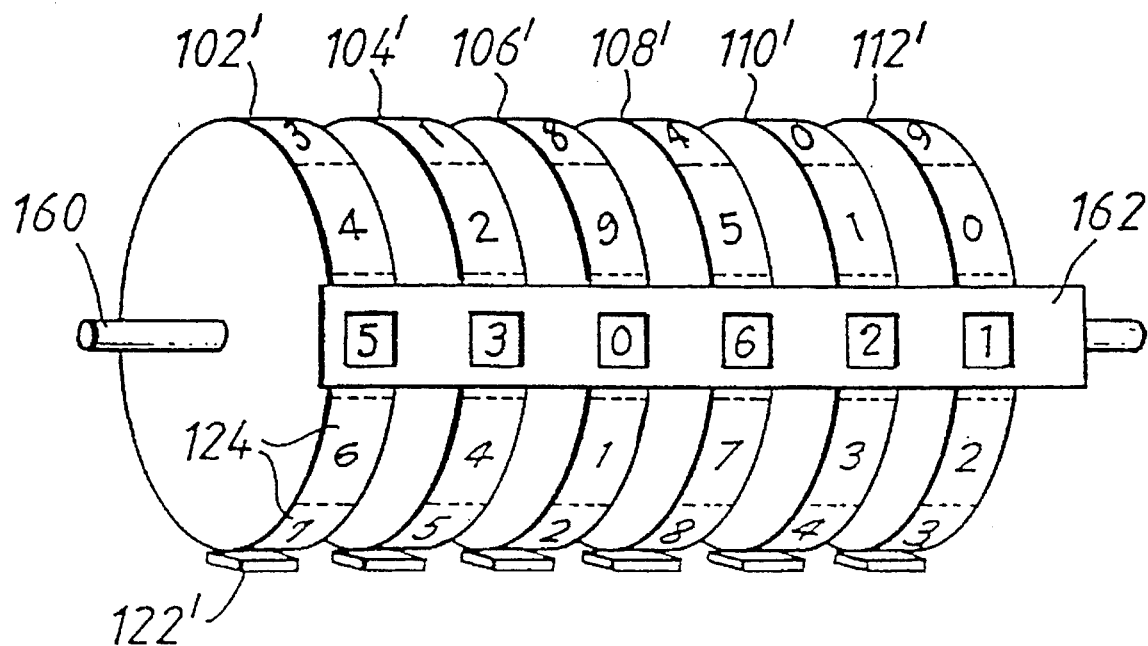
FIG. 16 is a diagrammatic perspective showing an alternative form of dial arrangement.
Figure 17:
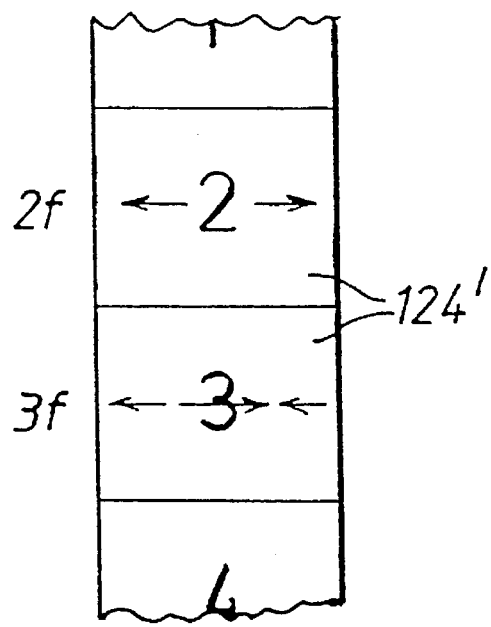
FIG. 17 diagrammatically illustrates part of the patterns of magnetisation provided on the dials of FIG. 16.

FIG. 16 shows a modified meter arrangement. In this embodiment the dials 102' to 112' are mounted on a common axle 160 and the dial numbers are on the periphery rather than on the end face and visible through an apertured window plate 162. The numbers on the dial face are marked on hard magnetic strips 124 which, as shown in FIG. 17, have recorded thereon magnetic patterns similar to those shown in FIG. 12. Magnetostrictive resonator elements 122'A to 122'F are, as in FIG. 10, located adjacent the peripheries of the dials. However, in this case, the axial lengths of the dials and thus the lengths of the magnetostrictive strips and of the hard magnetic strips are shorter than in FIG. 10.

Figure 18:
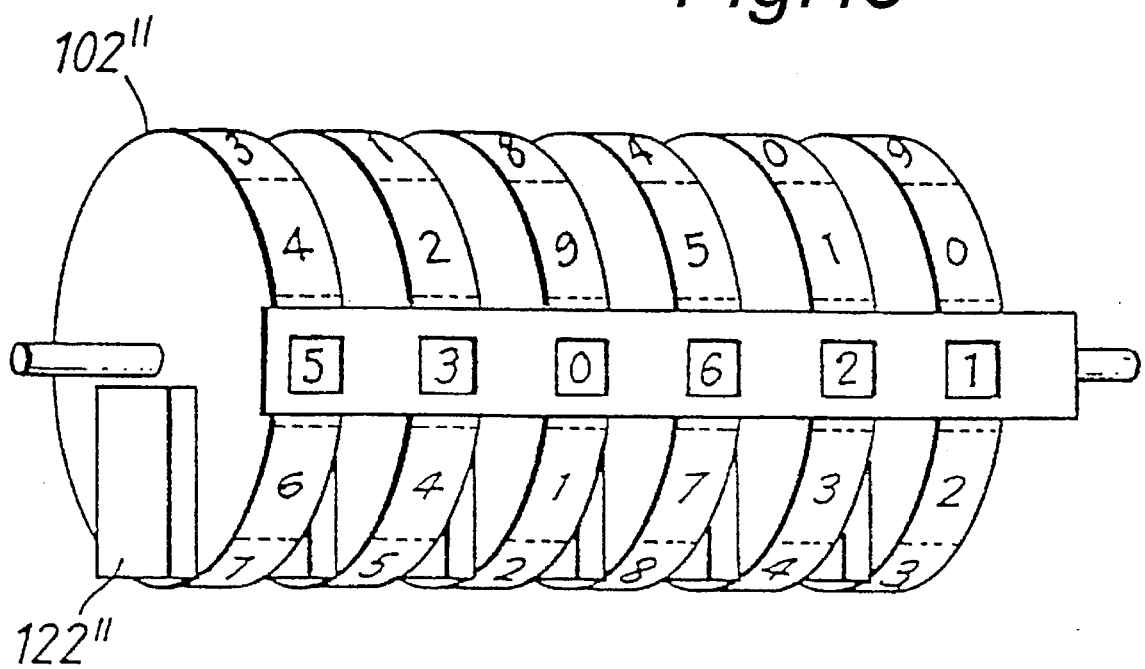
FIGS. 18 and 19 are similar to FIGS. 16 and 17, but showing a further alternative dial arrangement.
Figure 19:
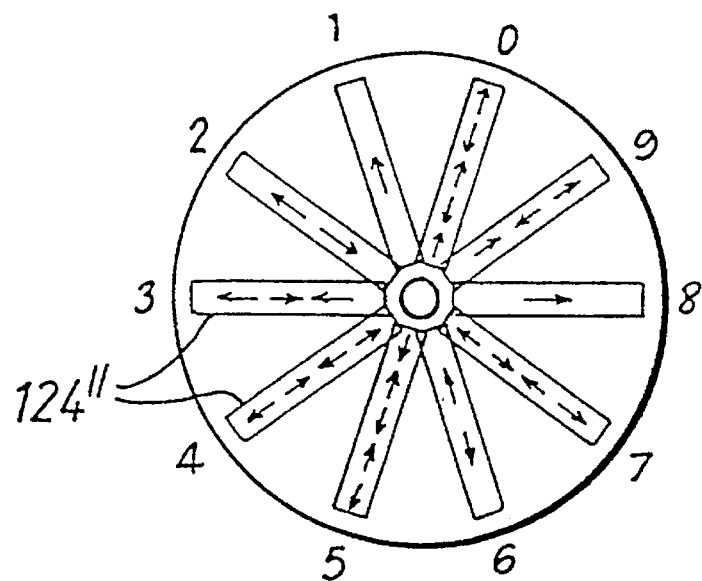
Figure 22:
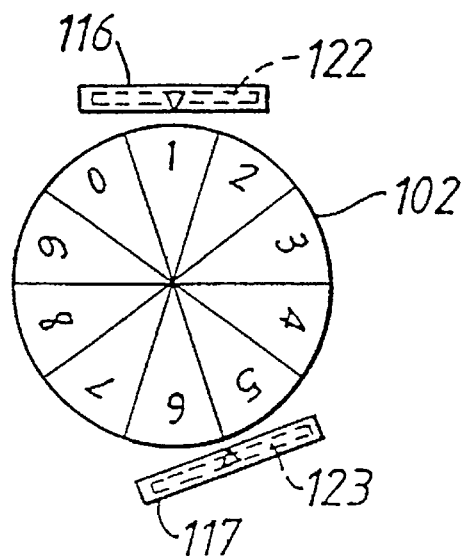
FIG. 22 illustrates a further embodiment, in which increased accuracy may be achieved.

The embodiment of FIG. 18 and 19 is similar to that of FIGS. 16 and 17 except that magnetostrictive strips 124" are provided on the side faces of the dials instead of their peripheries as shown best in FIG. 19, 20 and the magnetostrictive resonators 122" are positioned adjacent the side faces as shown in FIG. 22. The resonators 122" and strips 124" extend radially in FIGS. 18 and 19.

Figure 20:
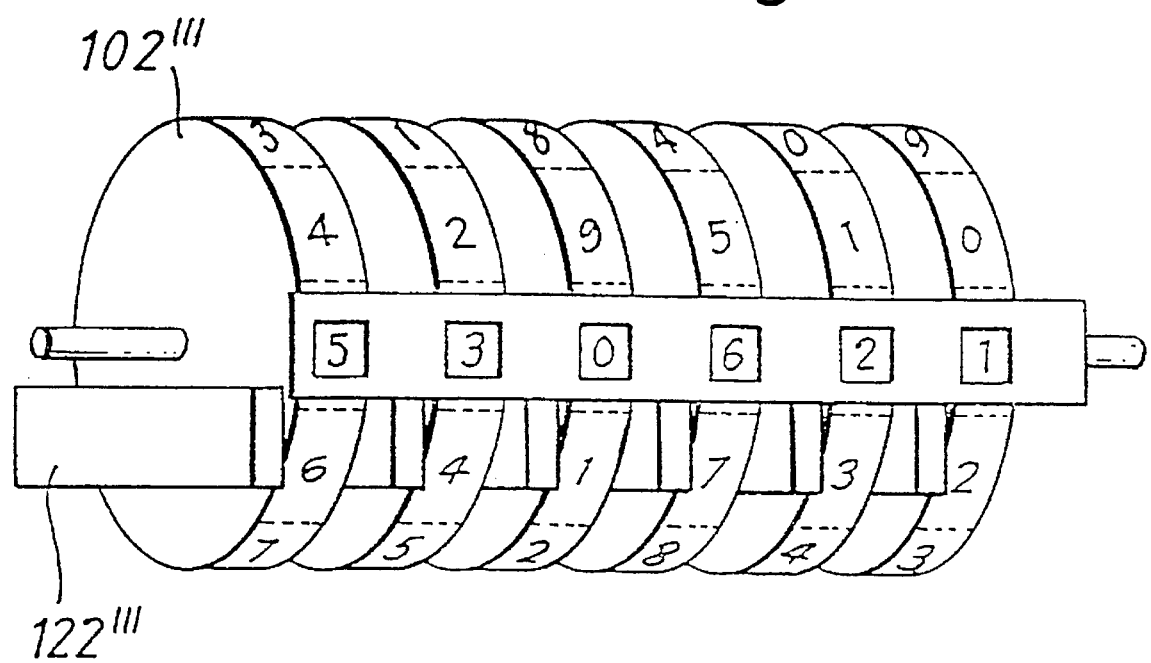
FIGS. 20 and 21 are also similar to FIGS. 16 and 17 and showing a yet further alternative arrangement of dials.
Figure 21:
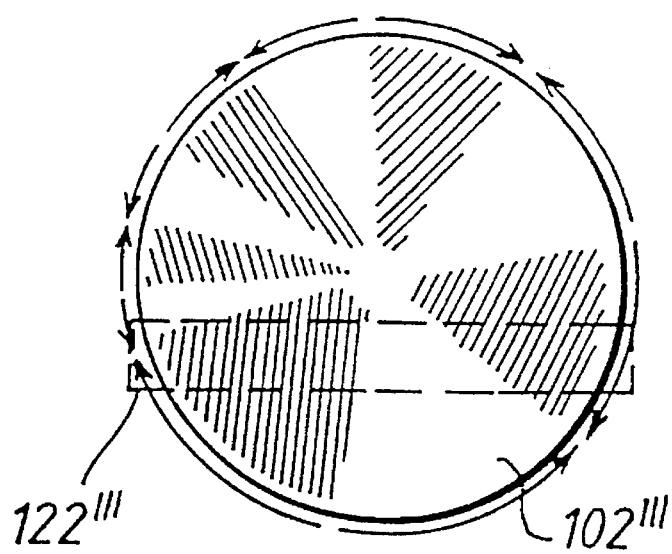

In FIGS. 20 and 21, the arrangement is similar to that shown in FIGS. 18 and 19 but the magnetostrictive strip elements 122'" extend along a chord of the side faces of the dials 102' to 112' and a hard magnetic disc is provided on the side face of each dial and magnetic patterns are recorded thereon as shown in FIG. 21. In that Figure, shaded areas indicate that the direction of the field is clockwise and unshaded areas indicate that the direction of the field is anticlockwise. Thus, it will be readily appreciated that the adjacent strips 122'" may be biased to resonate at selected frequencies as in the previous embodiments.

FIG. 22 illustrates a modification to the dial arrangement of FIG. 10 for increased accuracy. The arrangement of FIG. 22 is the same as that of FIG. 10 except that the dial has associated therewith an additional magnetostrictive resonator 123 contained in a casing 117. The arrangement of the resonators 122 and 123 relative to the dial 102 is such that when one of the numbers on the dial and therefore one of the strips 124 is aligned with one of the resonators, the other resonator is approximately half way between two of the adjacent strips 124. So that the resonances from the two strips 122 and 123 can be distinguished from each other, they are preferably of different lengths. By appropriate decoding of the signals regenerated by the two strips, accurate determination of the position of the dial can be made. Although FIG. 21 only shows a single dial, the same arrangement can be provided on each of the other dials in the meter with of course different frequencies for the different strips.

With reference to FIGS. 23 to 26, an indicator 200 of a meter, such as a water or gas meter (not shown) comprises a set of six dials 202, 204, 206, 208, 210, 212 mounted coaxially on a support structure 214 which in turn is attached to a casing 216 (only partially shown) containing the gas or water flow sensing arrangement of the meter. The dials 202 to 212 are rotatable about their common axis 218 and are interconnected and driven by means not shown so as to form a six decade counter. As shown, each of the dials has the numerals 0 to 9 marked on its periphery and a window 220 is provided in the support structure 214 so that the position of the dials can be visually inspected for reading the meter, for which purpose a cover 222 enclosing the structure 214 is transparent.

To enable the meter to be read electromagnetically, an array 224 of magnetostrictive elements is positioned adjacent the dials 202 to 212 and each dial 202 to 212 carries two members 226a, 226b which are of hard magnetic material and are magnetized for applying DC bias fields to the magnetostrictive elements in the array 224. The arrangement is such that the magnetostrictive elements in the array 224 all have different fundamental frequencies and different combinations of magnetostrictive elements are biased for different meter readings.

Figure 24:
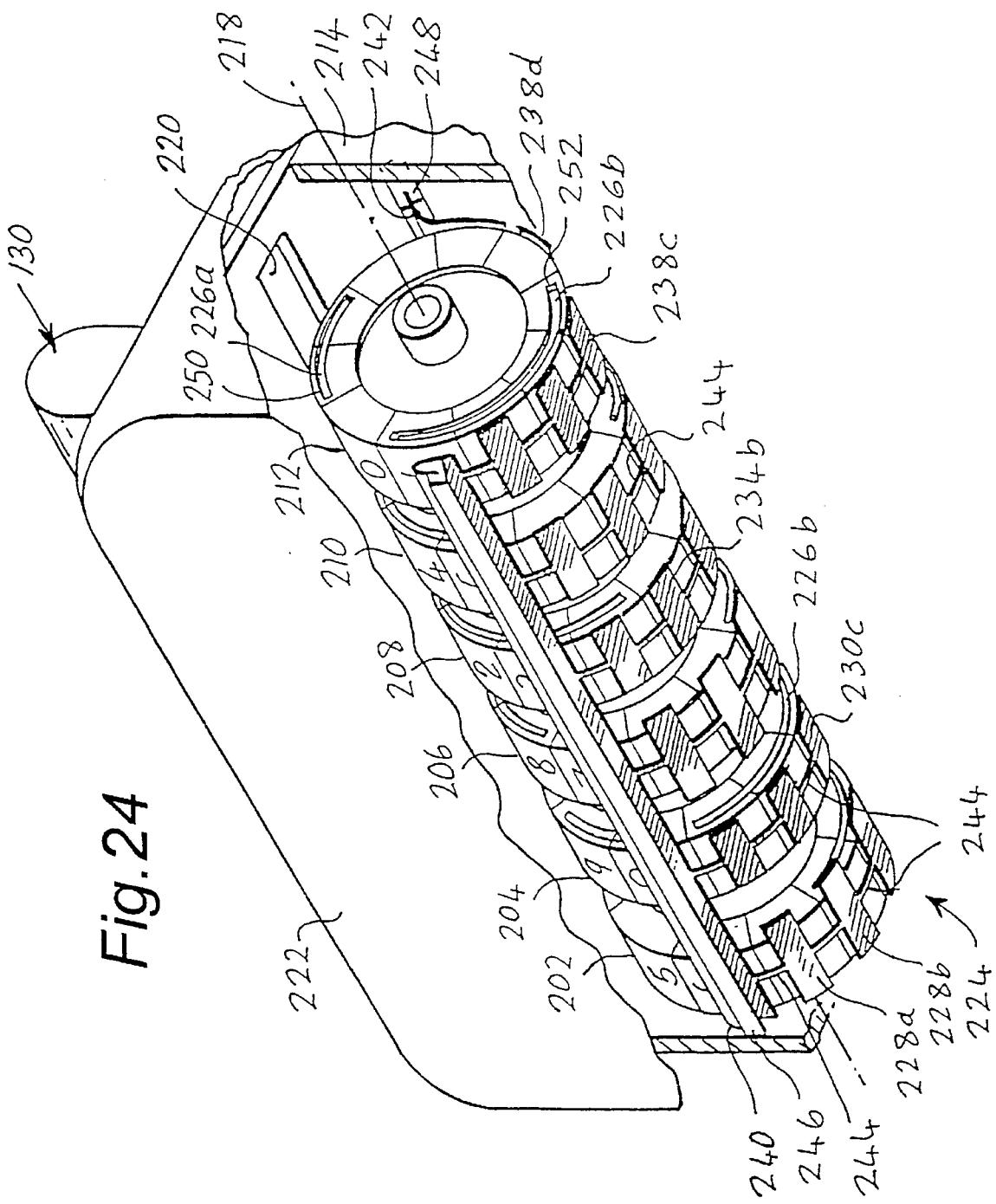
FIG. 24 is a perspective view of part of the embodiment shown in FIG. 23.
Figure 25:
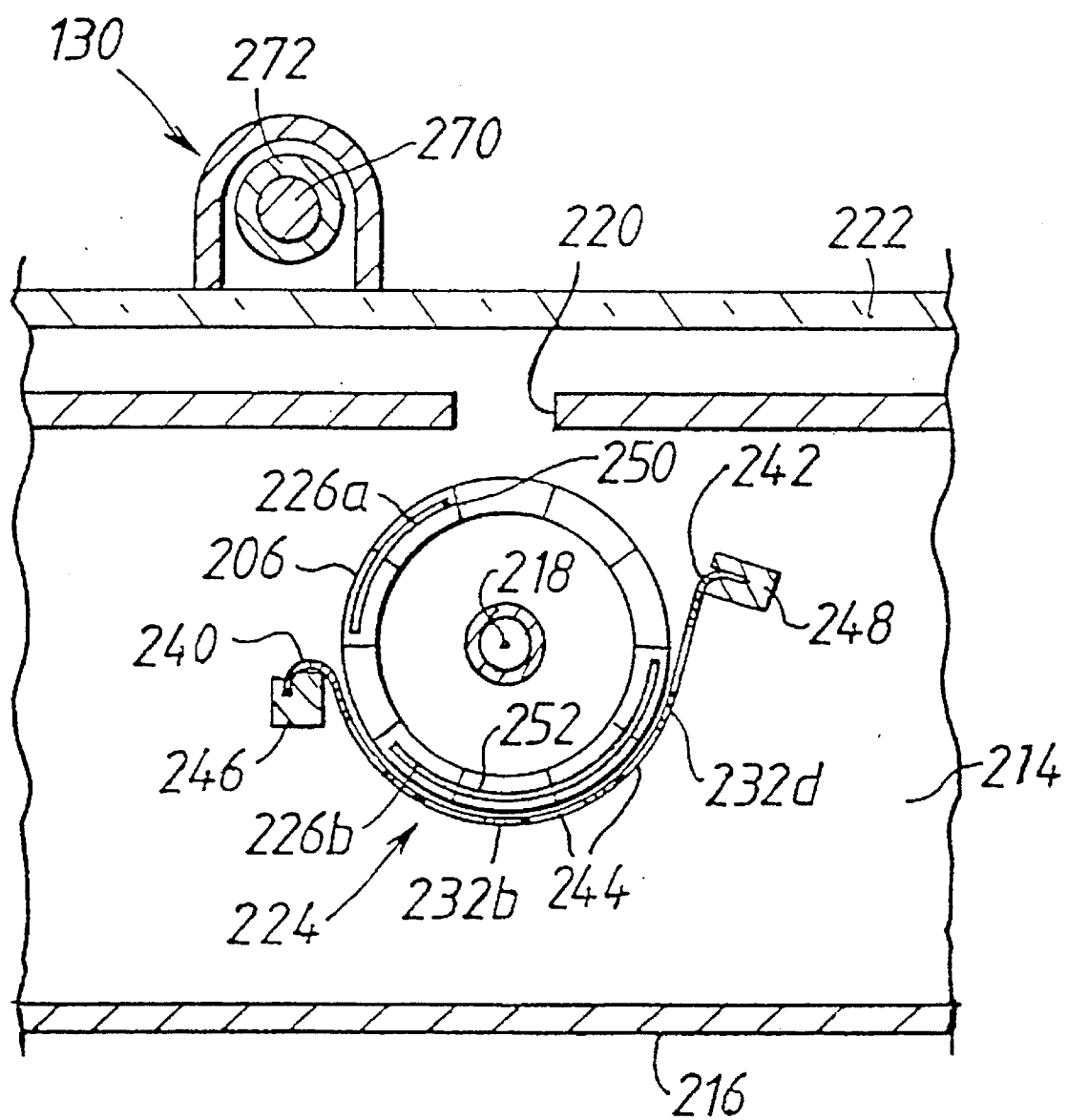
FIG. 25 is a partial section on the line X—X of FIG. 23.

Thus, the array 224 comprises 6 sets of magnetostrictive elements, the sets being indicated respectively by reference numbers 228, 230, 232, 234, 236 and 238. Each set is positioned adjacent a respective different one of the dials 202 to 212. Each set 228 to 238 comprises 4 magnetostrictive elements 228a to d, 230a to d etc. The magnetostrictive elements are of each set are interconnected with each other and with support plates 240 and 242 by ligaments 244. Conveniently, the array 224, plates 240 and 242 and ligaments 244 may be formed by etching a sheet of magnetostrictive material. The support plates 240 and 242 are clamped to support bars 246 and 248 respectively which in turn are carried by the structure 214 so that, as best seen in FIGS. 24 and 25, the array 224 is mounted in a curved configuration concentric with the dials and closely adjacent the peripheries thereof with each set 228 to 238 of magnetostrictive elements adjacent the respective associated dial 202 to 212. The arrangement is such that each set 228 to 238 of magnetostrictive elements extends round part of the circumference of its associated dial and each magnetostrictive element 228a to d to 238a to d extends axially with respect to its associated dial 202 to 212. The magnetostrictive elements 228a to d etc of each set are spaced so as to be in register with four successive numbers on the dial periphery for each of the ten integer positions of the dial.

Figure 27:
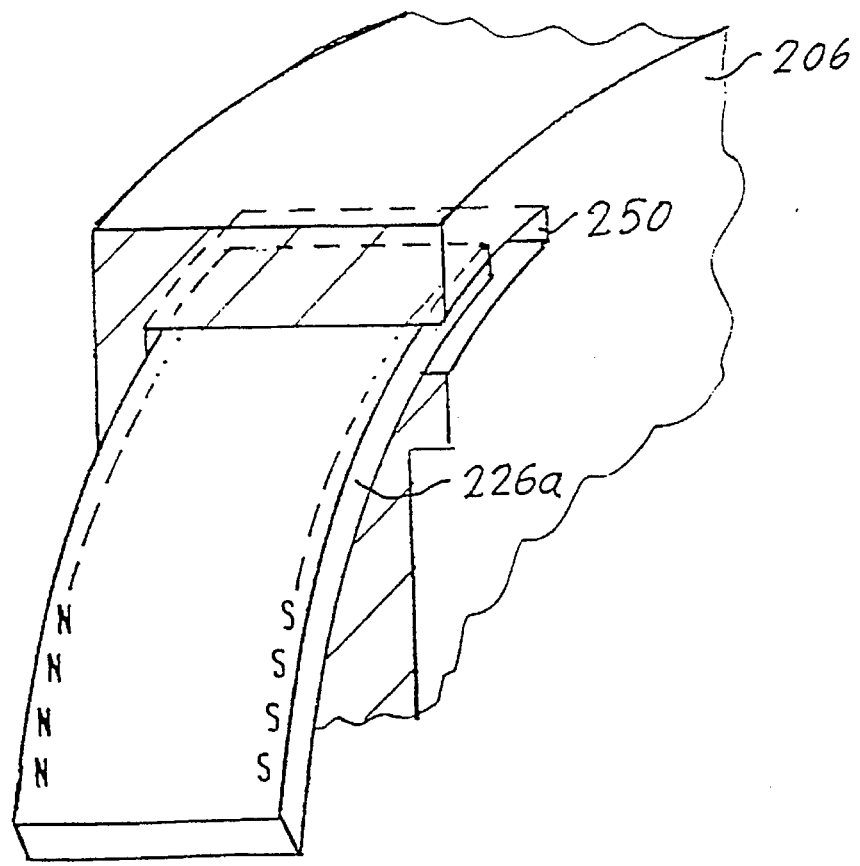
FIG. 27 is an enlarged partial perspective view partly cut away of a dial included in the embodiment of FIGS. 23 to 26.

The hard magnetic element 226a, which is a rectangular piece of material bent into an arc and positioned in an arcuate slot 250 in the dial, extends circumferentially over two adjacent digit positions of the dial, as best seen in FIG. 25 and 27.

The hard magnetic element 226b, which is a rectangular piece of material bent into an arc and located in an arcuate slot 252 in the dial, extends over four adjacent digit positions as also best seen in FIG. 25. Thus, by way of example, hard magnetic element 226a may extend over digit positions 8 and 9 and hard magnetic element 226b may extend over digit positions 3 to 6. Digit positions 0, 1, 2 and 7 do not have a hard magnetic element associated with them. With this arrangement, different combinations of the four magnetostrictive elements 228a to 228d etc for each dial will be magnetically biased by the elements 226a and 226b for each different digit position of the dial. The elements 226a and 226b are each magnetized so that their north and south poles N,S are spaced apart axially of the dials, i.e. the north and south poles N,S run along the respective longitudinal edges of the elements 226a and 226b and create fields which are directed axially of the dials 202 to 212. The arrangement is such that the DC biasing field direction experienced by the magnetostrictive elements of each set 228 to 238 is as shown by the arrows 254, 256, 258, 260, 262 and 264 in FIG. 26. Thus, the direction of biasing is longitudinally of each magnetostrictive element (as is shown in the diagram of FIG. 1) so that each element will resonate longitudinally (i.e axially of the dials) in response to an applied alternating magnetic field having a frequency corresponding to its fundamental frequency of mechanical vibration. As shown by the arrows 254 to 264 in FIG. 26, alternate biasing fields 254, 258 and 262 are successively in opposite directions to each other. This also applies to alternate biasing fields 256, 260 and 264. This arrangement ensures that the alternate biasing fields (say 254 and 258) will not add to cause unwanted biasing of the intermediate set of magnetostrictive elements (say 230).

Each of the twenty-four magnetostrictive elements in the array 228 has a different length and thus a different fundamental frequency. As a result of this and of the interaction between the magnetostrictive elements and the hard magnetic elements 226a and 226b provided in each dial, a code is provided whereby a unique combination of frequencies for each of the numbers from 0 to 999,999 will be generated upon application of an alternating magnetic field containing or swept through all of the fundamental frequencies of the magnetostrictive elements. This will be more fully understood from consideration of the following table which illustrates the coding of a single dial. The left hand column indicates the digit positions 0 to 9 and the columns headed a to d correspond respectively to the four magneto strictive elements asssociated with that dial (for example 228a to 228d). The binary digits "0" or "1" in each of the columns a to d indicate whether or not a respective magnetostrictive element is biased by the hard magnetic element 226a or 226b. Binary "0" indicates that the element is not biased and will therefore will not resonate in response to the interrogating field and binary "1" indicates that the element is biased and therefore will resonate in response to the interrogating field.

TABLE 2

| DIAL POSITION | MAGNETO STRICTIVE ELEMENT | | | |
|---|---|---|---|---|
| | a | b | c | d |
| 0 | 0 | 1 | 1 | 1 |
| 1 | 1 | 0 | 1 | 1 |
| 2 | 1 | 1 | 0 | 1 |
| 3 | 0 | 1 | 1 | 0 |
| 4 | 0 | 0 | 1 | 1 |
| 5 | 0 | 0 | 0 | 1 |
| 6 | 1 | 0 | 0 | 0 |
| 7 | 1 | 1 | 0 | 0 |
| 8 | 1 | 1 | 1 | 0 |
| 9 | 1 | 1 | 1 | 1 |

In the embodiment shown in FIGS. 23 to 27, electro magnetic reading of the meter is achieved in the manner described with reference to FIG. 15 for which purpose, a coil 130 is mounted on the housing 222. In this embodiment, the coil 130 comprises a ferrite rod 270 with a winding 272 therealong, the winding being connected to the coil 132 shown in FIG. 15. The control unit 140 of the reading device is programmed to apply the interrogating field in pulses with listening intervals between the pulses and the coil 270, 272 acts both to generate the interrogating field and to pick up the regenerated fields from the magnetostrictive elements during the listening intervals.

Further, the embodiment of FIGS. 23 to 27 includes an identity tag 280 (FIG. 23) mounted on the structure 214 enabling the identity of the meter to be automatically determined and recorded by the apparatus shown in FIG. 15. The tag 280 comprises a hollow tray 282 made of synthetic plastics material or other magnetically transparent material containing a magnetostrictive element 12a similar to the element 12 of FIG. 1 and a hard magnetic element 14a, similar to the element 14 of FIG. 1, is secured to and forms a cover for the tray 282. The element 12a is free to vibrate in the tray 282 and the element 14a is encoded in the manner described with with reference to FIGS. 1 to 9 with a magnetic pattern which biases the element 12a to resonate at a combination of its harmonic frequencies or its fundamental and harmonic frequencies chosen to indicate the identity of the particular meter.

Various coding arrangements for representing the identity of the meters by means of tags 280 are possible. For example, the different digits of a binary number might be represented by resonance at different harmonics. Thus, for example, the digits of a four bit binary number might be represented respectively by resonances at twice, three times, four times and eight times the natural frequency of the magnetostrictive element. The presence of a resonance might indicate binary 1 and absence binary 0. However, whilst this arrangement will be satisfactory for binary numbers having relatively few digits, signal to noise ratio will tend to decrease as the number of digits is increased if this coding arrangement is used. An alternaitve coding arrangement which would give numbers from 0 to 219 would be to record only three harmonics (with the fundamental frequency excluded as such frequency carries the highest risk of being excited accidentally). Thus, there are 220 possible combinations of 3 out of 12 harmonics. This coding system would almost equate to an eight bit binary number (which can give 256 combinations) but with a much higher signal to noise ratio and therefore much higher reliability than would be obtained if up to eight harmonics were to be recorded simultaneously on each tag. An advantage of this system is that if more or less than three resonances are detected at any given time this suggests that there is a malfunction. Thus, the decoding apparatus used with this system of representing data may be programmed to generate an alarm in response to the detection of an incorrect number of resonances.

In practice, as there may well be very large numbers of meters to be read, each identity tag would comprise a number of magnetostrictive elements thus to provide a sufficiently large number of bits in the code to enable each meter to be uniquely identifiable.

During interrogation, each frequency of the interrogating field may be transmitted in turn with a listening interval between. Alternatively, the frequency of the interrogating field could be swept through all relevant frequencies and there would thereafter be a listening interval for listening for all frequencies. This will normally only be practical when relatively few frequencies are used as the sweeping must, on the one hand, be slow enough to ensure that there is sufficient time for a response to be generated at each frequency and, on the other hand, the sweep must be completed in a time sufficient that all elements will still be resonating after the sweep has been completed. As a further alternative, an interrogating field having components at all the required frequencies could be transmitted simultaneously followed by a listening interval. If desired, reading may be obtained by repeating the electromagnetic reading operation a number of times for noise reduction or error detection.

By way of example, the magnetostrictive elements in the array 224 may vary in the length from between 5 mm and 10 mm and may have resonances in the range 225 kHz to 450 kHz.

The coding system shown in the above Table 2 ensures that at least one resonance arises for all dial positions. Thus, absence of response to the interrogating field represents a fault.

Figure 28:
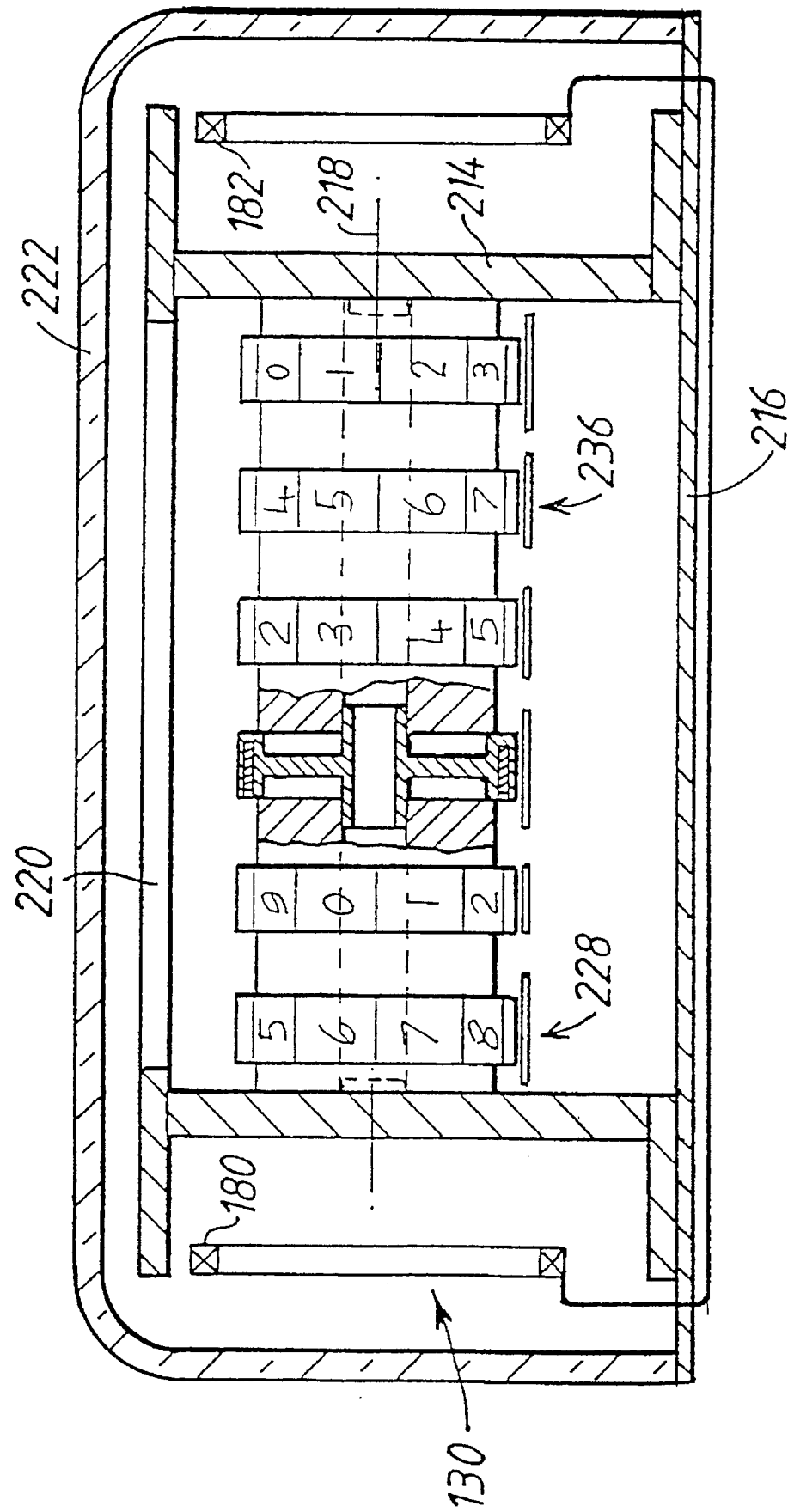
FIG. 28 is a view similar to FIG. 23 showing a modification to the embodiment of that Figure.
Figure 29:
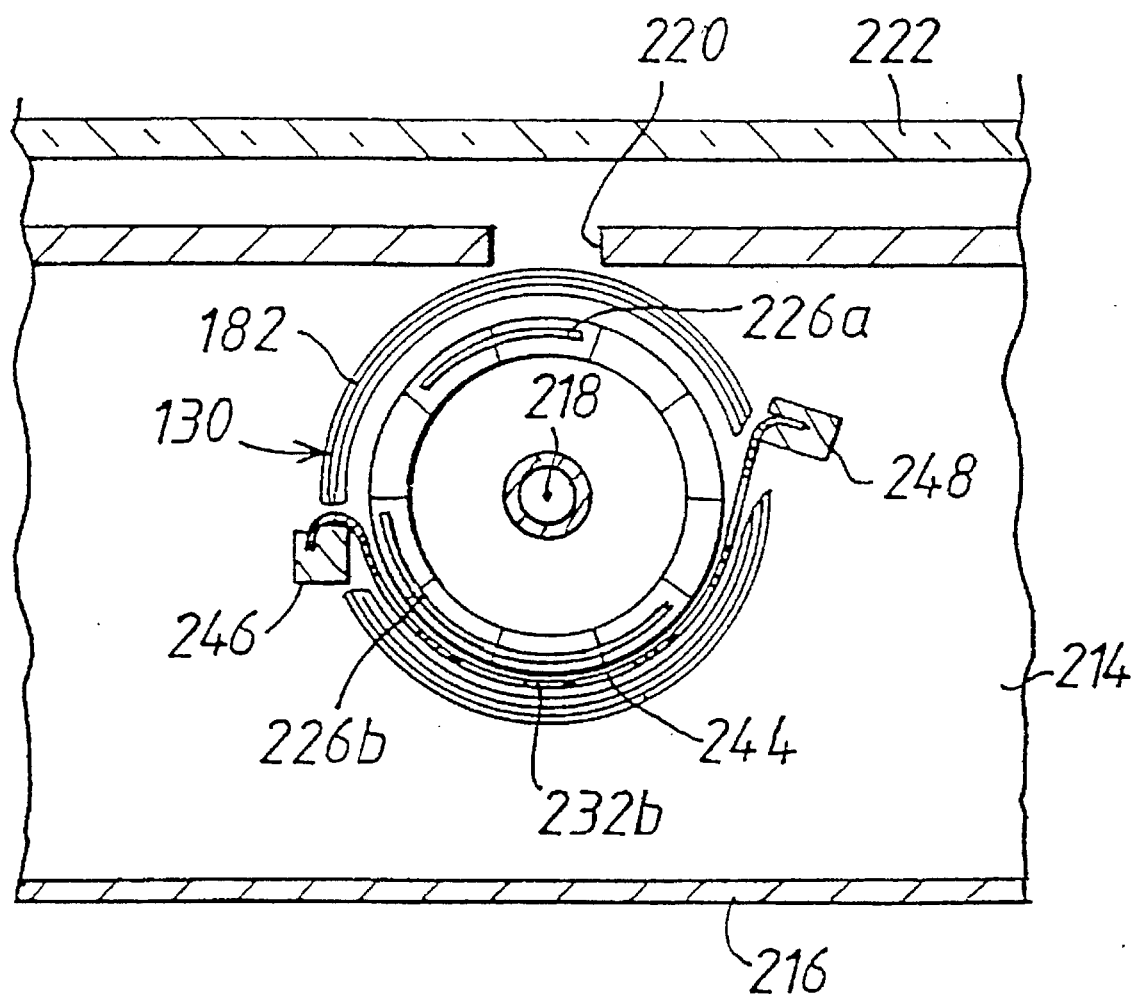
FIG. 29 is an end view of the apparatus shown in FIG. 28.

The embodiment shown in FIGS. 28 and 29 is identical to that of FIGS. 24 to 27 except for the interrogating coil arrangement. In this embodiment, the coil 130 is divided into two parts 180 and 182, one at each end of the set of dials 202 to 212, the coil portions 180 and 182 being generally coaxial with the dials. Any of the reading sequences described above may be employed.

Linear Encoders

Figure 30:
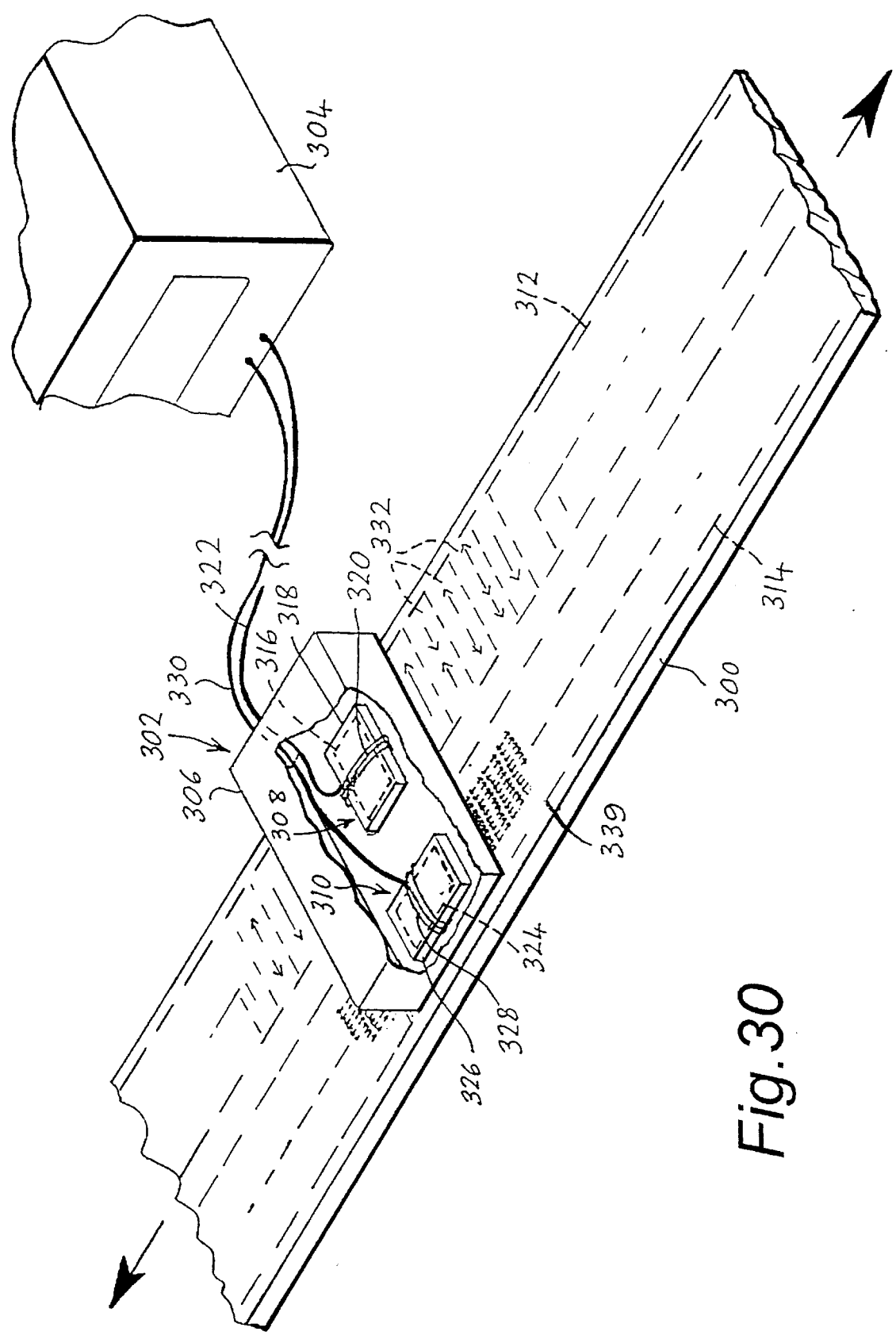
FIG. 30 is a diagrammatic perspective view partly cut away showing a further embodiment of the invention.

FIG. 30 diagrammatically illustrates a linear encoder embodying the invention. This comprises a linearly movable elongate strip 300 whose position is to be monitored or detected, a stationary transducer unit 302 positioned adjacent the strip 300 for monitoring the position thereof, and a control and display unit 304 connected to the transducer unit 302 for processing signals therefrom and producing a display of position of the strip 300.

The transducer unit 302 comprises a housing 306 containing two magnetostrictive transducers 308 and 310. The transducer 308 is positioned above a coarse indicator track 312 provided on strip 300 and extends transversely of the strip and transducer 310 is positioned above a fine indicator track 314 provided on the strip 300 and extends longitudinally of the strip 300. The transducer 308 comprises a magnetostrictive element 316 within a magnetically transparent casing 318 and free to vibrate therein, and a coil 320 which is connected by wires 322 to the unit 304. Similarly, the transducer 310 comprises a magnetostrictive element 324 within a magnetically transparent casing 326 and free to vibrate therein, and a coil 328 connected by wires 330 to the unit 304.

The track 312 comprises a series of hard magnetic segments or elements 332 having different magnetic patters recorded thereon in a manner similar to FIG. 12. Thus, the segments 332 may be separate elements attached to the belt 300 or may be constituted by successive portions of a single continuous strip of magnetic material on the belt 300. The magnetic patterns on the segments 332 co-operate with the magentostrictive element 316 such that the element 316 will, in response to interrogating fields of appropriate frequencies created by the coil 320 under control of the unit 304, resonate at different combinations of its fundamental and/or harmonic frequencies according to a code indicative of the position of the element 300. In this way, a coarse but absolute indication of position of the strip 300 is given.

Figure 31:
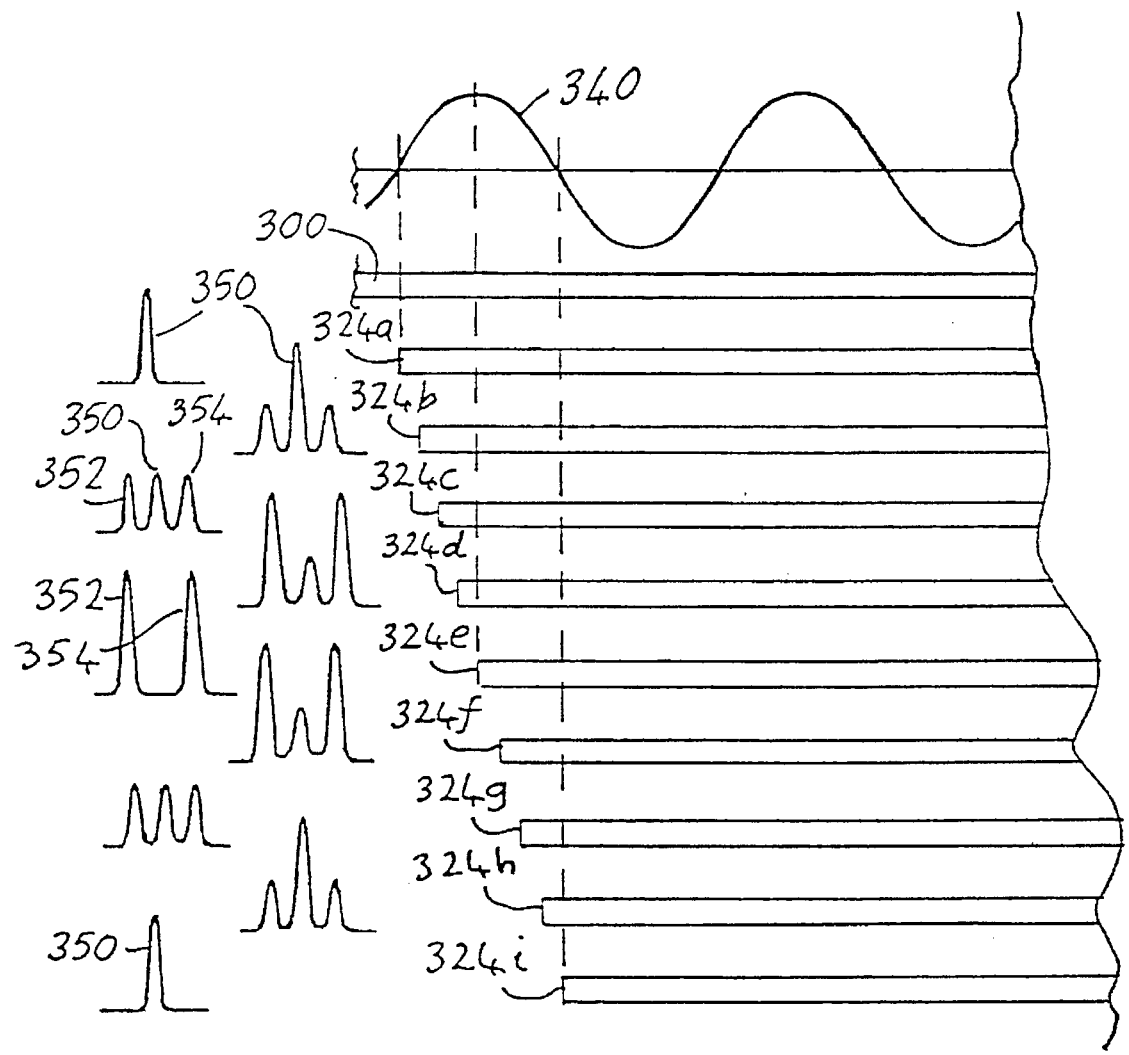
FIG. 31 is a diagram illustrating the operation of the embodiment of FIG. 30.

The track 314 is also a hard magentic material and has recorded thereon a magnetic pattern 339 produced by applying to a recording head (such as that shown in FIG. 3) a high frequency sine wave signal 340 (FIG. 31). The pattern 339 extends along the track continuously from one end to the other and consists of successive magnetised zones producing bias fields in opposite directions parallel to the length of the strip 300 as shown in FIG. 30. The frequency of the signal 340 is, relative to the length of the magnetostrictive element 324 (in a direction parallel to the strip 300) such as to bias the element 324 to resonate at a high order harmonic in response to an interrogating field of appropriate frequency applied by the coil 328. For example, the element 324 might have a length of 20 mm and the signal 340 might have a wavelength of 2 mm so as to bias the element 324 to resonate at its 20th harmonic.

FIG. 31 illustrates diagrammatically the signal 340 extending along the strip 300 and indicates by reference numbers 324a to 324i nine examples of the possible positions of the end of the element 324 relative to the signal 340. At position 324a, the end of the element 324 is coincident with a zero crossing point of the signal 340 and, as indicated at 350, the element 324 will resonate at a single harmonic (the 20th in the example given above) in response to the interrogating field of this frequency. This is true of each zero crossing point and thus is also true for the position 324i shown in FIG. 31. When the end of the element 324 is coincident with a maximum or minimum of the signal 340, for example as shown an 324e, the magnetostrictive element 324 does not resonate at the harmonic 350, but instead resonates at harmonics 352 and 354 below and above the harmonic 350 respectively. As can be seen from FIG. 31, as the relative position between the element 324 and the signal 340 moves from the position 324a to 324e, the resonance indicated at 350 gradually decreases and the resonances indicated at 352 and 354 gradually increase. There is a position at 324c where all three resonances are of equal amplitude which corresponds to about 60 degrees of the sine wave. Between 60 and 90 degrees, the resonances 352 and 354 become larger than that at 350. Upon movement from the 90 degree (maximum) position of the wave 340 to the next zero crossing point, the resonances at 352 and 354 decrease in amplitude and the resonance at 350 again increases in amplitude until at the next zero crossing point 324i, the resonance at 350 only remains. This is repeated as each half cycle of the recorded signal 340 moves past the magnetostrictive element 324. Thus, by applying appropriate interrogating frequencies to the coil 328, the resonances 350, 352 and 354 can be excited and detected so as to determine the position of the member 300 with high resolution but with no absolute indication of position. As will be clear from FIG. 31, such resolution can easily be obtained to within a quarter of the wavelength or better. Resolution to less than 1 mm or down to perhaps 10 microns would be achievable.

Figure 32:
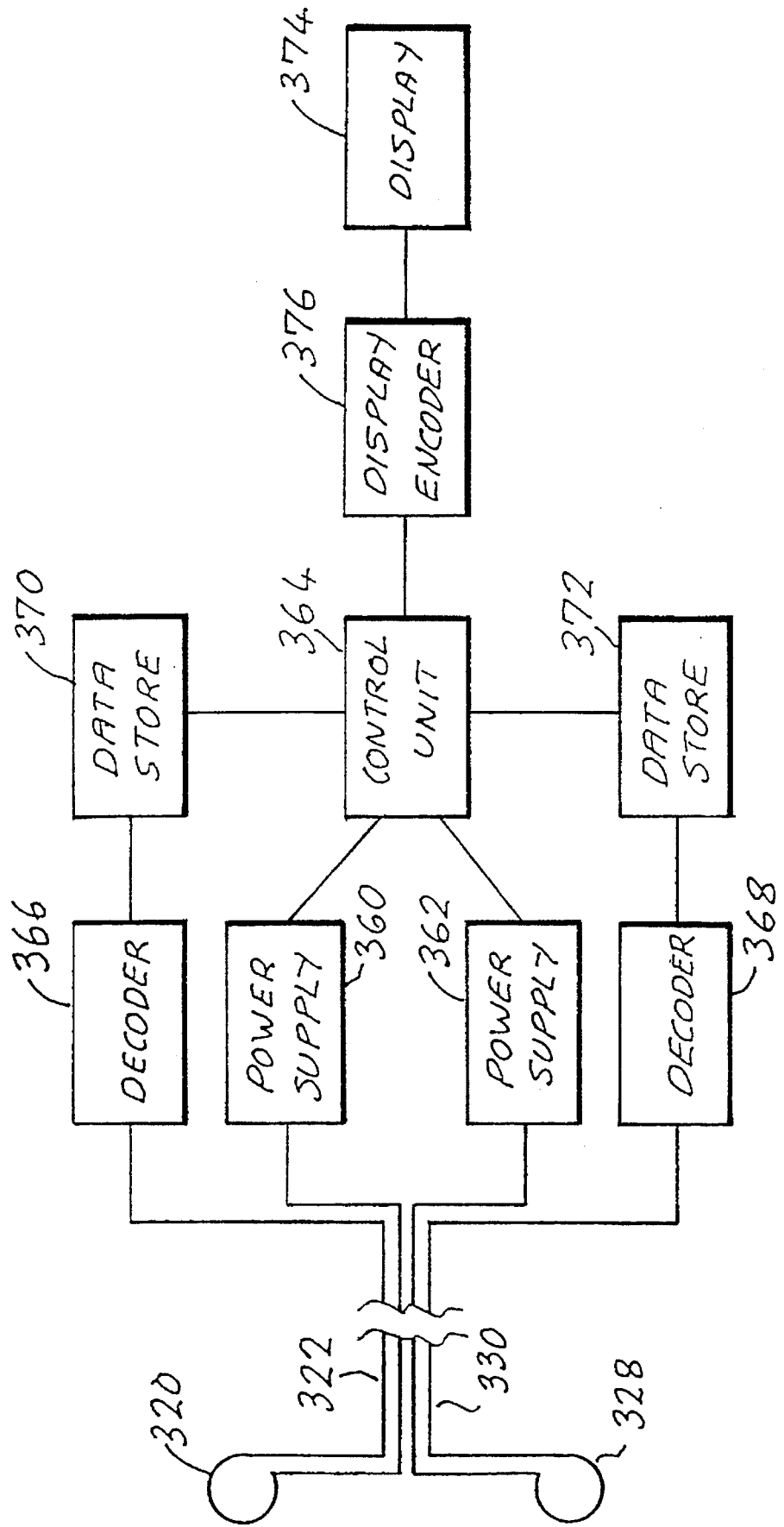
FIG. 32 is a block diagram of a control and display unit of the embodiment of FIG. 30.

As shown in FIG. 32, the unit 304 comprises power supplies 360 and 362 for energising the coils 320 and 328 respectively, a control unit 364 for causing the power supplies to be energised in pulses and at a frequency swept through the range of frequencies selected for the particular embodiment (or alternatively such frequencies may be transmitted in a burst), decoders 366 and 368 for decoding the signals generated by resonance of the elements 316 and 324 respectively, data stores 370 and 372 for storing data from the decoders and a display 374 energised by a display encoder 376 to display the position of the element 300 under control of the control unit 364. The control unit 364 may comprise a microprocessor appropriately programmed.

The decoder 368 for decoding the signal received from the magnetostrictive element 324 may, where the interrogating signal is swept in frequency, operate as follows. The received signal will be (typically) a time-dependent voltage, containing up to three peaks of varying amplitude. This voltage signal can be digitised with an analogue-to-digital converter (ADC), and the resultant numbers stored in a convenient electronic memory (eg a FIFO—first-in-first-out-buffer). The processor unit can then search the memory to identify the peak values. This can be done by searching for the three highest values in the vicinity of the (known) peak positions, or by using numerical techniques to fit a three-peak curve to the data.

Other approaches can be used if higher speeds are desired. For example, the input voltage can be electronically differentiated and the zero-crossing (corresponding to the peaks of the original signal) identified. This technique is potentially very fast but is susceptible to noise.

Alternatively, if the magnetostrictive elements are interrogated by pulse-echo means, then the return signal can be passed through narrow-band filters to provide three channels. The value of the voltage in each channel then corresponds to the value of the peak signal.

In all cases the value of the position can be determined by a variety of means once the values of the peaks are known. For example, the ratio of the centre peak height to the heights of the "wing" peaks can be taken (once any background has been removed and provided care it taken to avoid "divide by zero"), and a look-up table used to convert this ratio to a measure of position.

Figure 33:
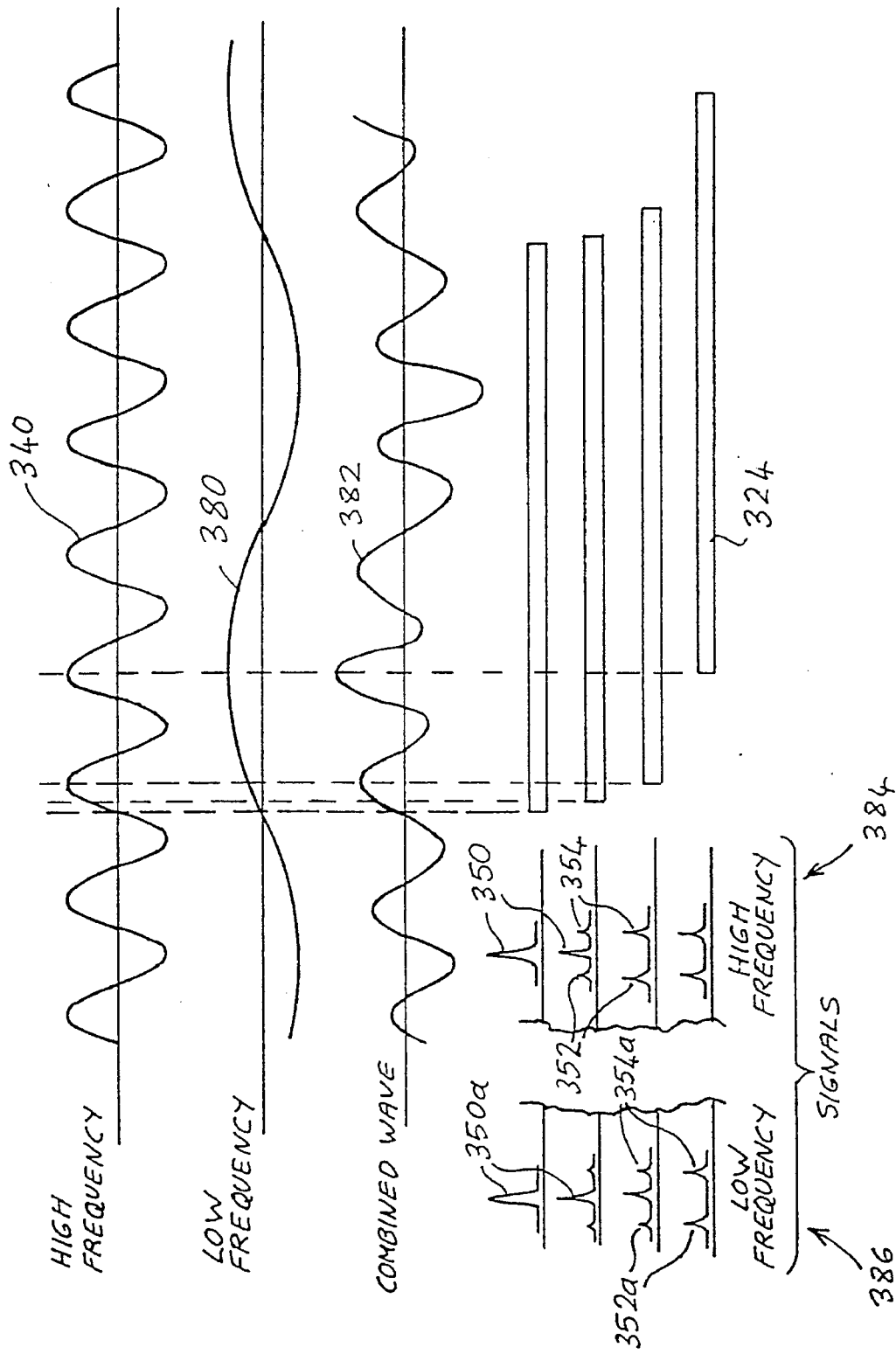
FIG. 33 is a diagram illustrating a modification to the embodiment of FIG. 30.

FIG. 33 is a diagram similar to FIG. 31 but shows a modification to the embodiment of FIG. 30 in which, in addition to the high frequency signal 340, recorded on the hard magnetic track 314, a lower frequency signal 380 is also recorded thereon, the composite of these two signals being indicated at 382 in FIG. 33. As shown at 384 in FIG. 33, the high frequency signal 340 produces resonances 350, 352 and 354 dependent upon the position of the element 324 with respect to the high frequency signal 340. As indicated at 386, the low frequency signal 380 produces resonances 350a, 352a and 354a, the resonance 350a appearing substantially alone when the end of the element 324 is coincident with a zero crossing point in the wave 380 and the resonances 352a and 354a appearing subtantially alone when the end of the element 324 is coincident with a maximum or minimum of the wave 380. By providing the low frequency signal 380 in addition to the high frequency 340, the distance through which the member 300 has to move before the resonances 384 and 386 repeat is increased compared to the arrangement shown with reference to FIG. 31.

Figure 34:
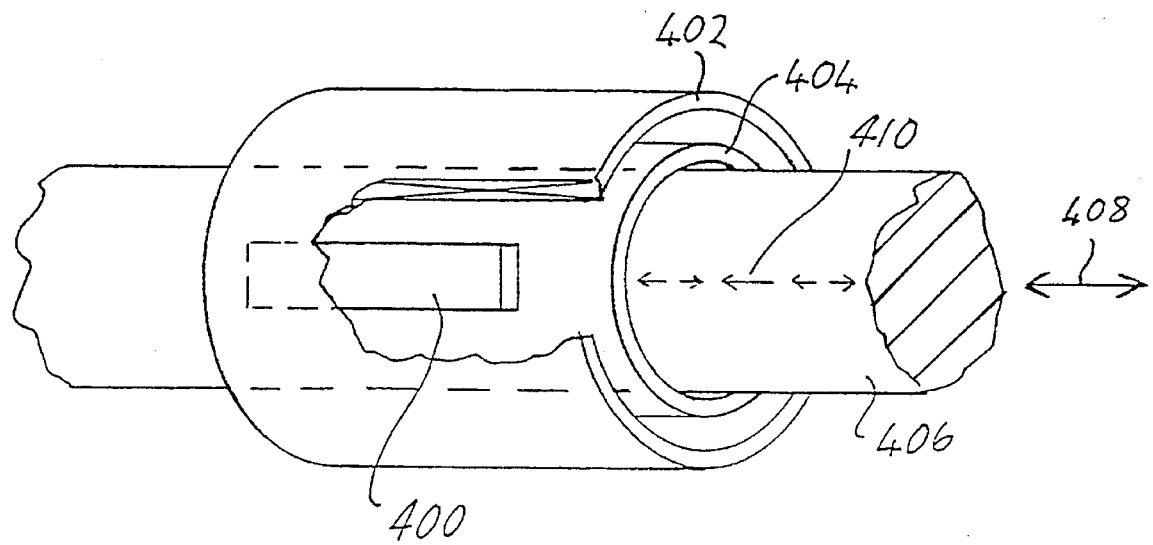
FIG. 34 is a perspective view partly cut away of a further embodiment of the invention.

FIG. 34 diagrammatically illustrates an embodiment in which the magnetostrictive element 400 is positioned between concentric coils 402 and 404, and a strut 406, whose linear position is to be detected, is movable axially through the coil 404 as indicated by arrow 408. A magnetic pattern 410 is recorded on the strut 406 for biasing the element 400 to resonate at different combinations of its fundamental and/or harmonic frequencies in the manner previously described. The coils 402 and 404 are for applying an interrogating field to the element 400 and detecting the regenerated field which arises upon resonance.

Figure 35:
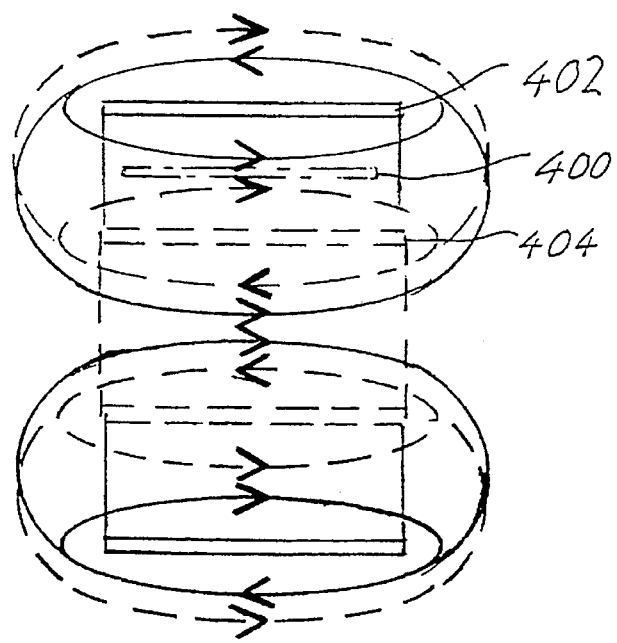
FIG. 35 is a diagram illustrating the operation of the embodiment of FIG. 34.

The winding of the coils 402 and 404 is such that, as shown by the arrows in FIG. 35, the fields they produce add in the annular space 412 between the coils and between which the element 400 is located but cancel in the region inside the coil 404 and the region outside the coil 402. In this way, unwanted stray magnetic fields produced upon energisation of the coils can be reduced or eliminated and sensitivity of the coils to unwanted stray electromagnetic fields may be substantially reduced or eliminated, such sensitivity otherwise arising since the strut 406, being of or comprising magnetic material, would tend to cause a single coil surrounding it to act as an antenna in which unwanted oscillations would be generated by unwanted stray electromagnetic fields.

One application for the device shown in FIGS. 34 and 35 is for detecting movement of a suspension strut in a motor car as is required, for example, in active suspension systems where suspension elements are driven in a feed back system.

In the illustrated embodiments, known magnetostrictive materials may be used for the magnetostrictive elements. Examples are amorphous, spin-melt ribbon such as sold under the trade mark "METGLAS 2605" or grain-oriented silicon transformer steel. The material chosen preferably has a high magnetic permeability with a high magnetostrictive coupling. The hard magnetic elements may be made of any of a variety of hard magnetic materials. Examples include magnetic stainless steel, nickel, ferrite or mild steel. Alternatively, the hard magentic material may comprise a nonmagnetic substrate having a magnetic coating thereon, such as slurry-formed ferrite as used in magnetic tapes and magnetic discs. The properties required for the biasing element are that it should be capable of being magnetised substantially permanently.

Modifications

A number of modifications which may be made in the above embodiments will now be described with reference to FIGS. 36 to 52.

As has been described above, the natural frequency of the rectangular magnetostrictive elements illustrated is dependent upon the length thereof and, where magnetostrictive elements having different natural frequencies have been described, they have been shown as having different lengths, for example, as in FIG. 14. Alternative ways of achieving different natural frequencies are illustrated in FIGS. 36 to 39.

Figure 36:
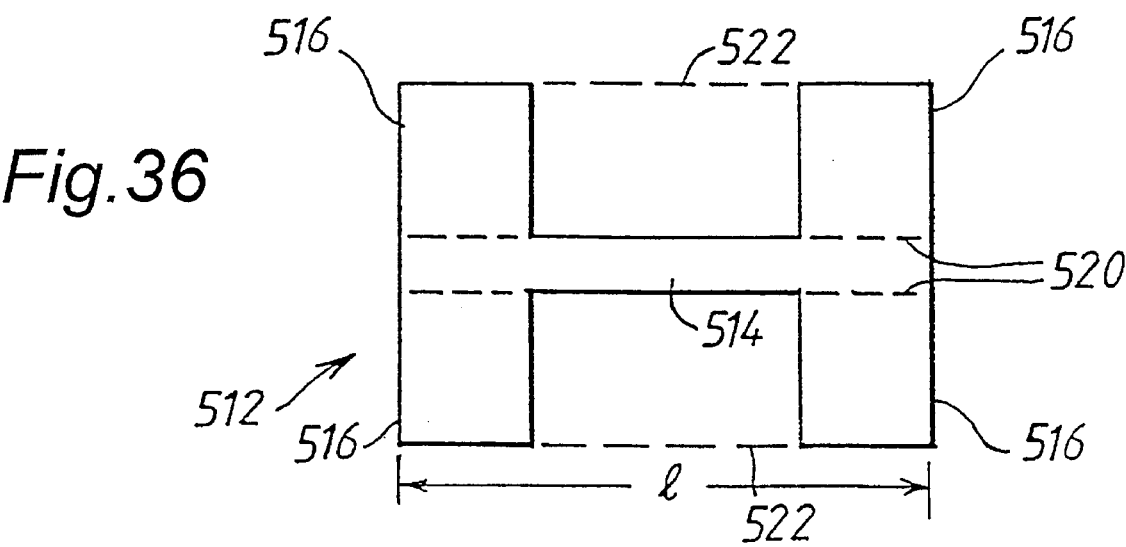
FIGS. 36 to 38 are diagrams showing further possible shapes for the magnetostrictive resonant element employed in the present invention.

FIG. 36 illustrates a magnetostrictive element 512 which may be utilized in a variety of embodiments of the invention. The element 512, which may be stamped or etched from a sheet of magnetostrictive material, comprises a strip 514 of length l with four side projections 516 adjacent its ends. The effect of the projections 516 is to reduce the natural frequencey that the strip 514 of length l would otherwise have. This reduction in natural frequency arises from the addition to the strip 514 of the mass associated with the extensions 516. Thus, for a given required natural frequency, the dimension l may be reduced. As in the previously described embodiments, a hard magnetic biasing member having an appropriate magnetic pattern recorded thereon will be associated with the element 512. The size and shape of the hard magnetic biasing member may, for example, be the same as the strip 514 as indicated by dotted lines 520 in FIG. 36 or, as an alternative, might be a rectangle whose size is equal to the outline shape of the element 512 as indicated by dotted lines 522 in FIG. 36. As a further alternative, the size of the hard magnetic biasing member might be intermediate the sizes indicated by lines 520 and 522.

Figure 37:
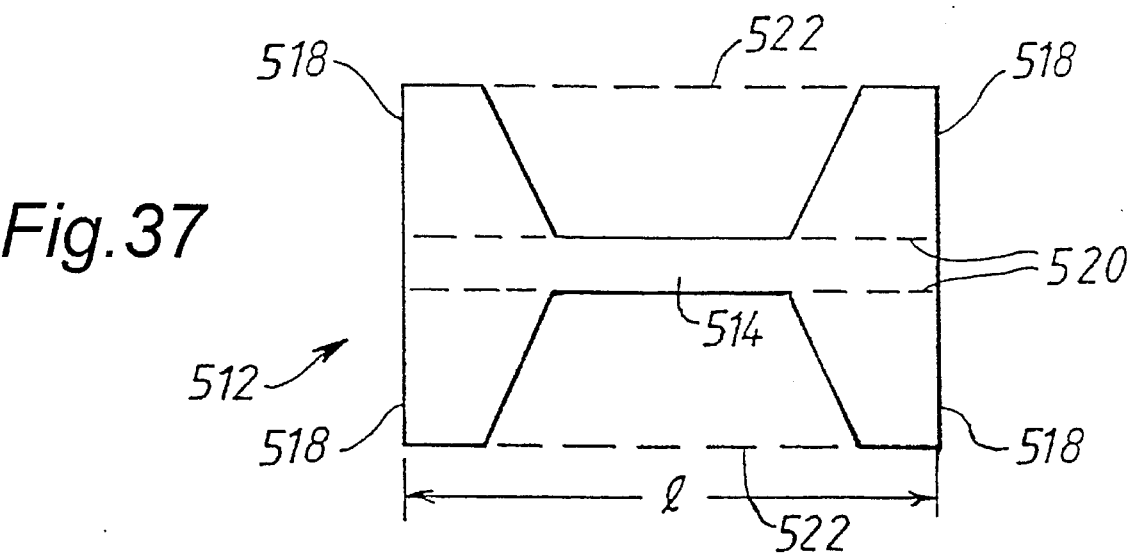

FIG. 37 shows a magnetostrictive element 512 similar to that shown in FIG. 36 except that, instead of rectangular projections 516, projections 518 of trapezoidal shape are shown. Thus, if the area of the projections 518 is less than that of the projections 516 but the elements shown in FIGS.

36 and 37 are otherwise the same, the natural or fundamental frequency of strip 514 of FIG. 37 will be somewhat higher than that of strip 514 of FIG. 36 due to the lower mass of projections 518 compared to projections 516. A hard magnetic biasing member as described with reference to FIG. 36 may be used with the element 512 shown in FIG. 37 and thus the same reference numbers in FIG. 37 designate items which correspond to those described with reference FIG. 36.

Figure 38:
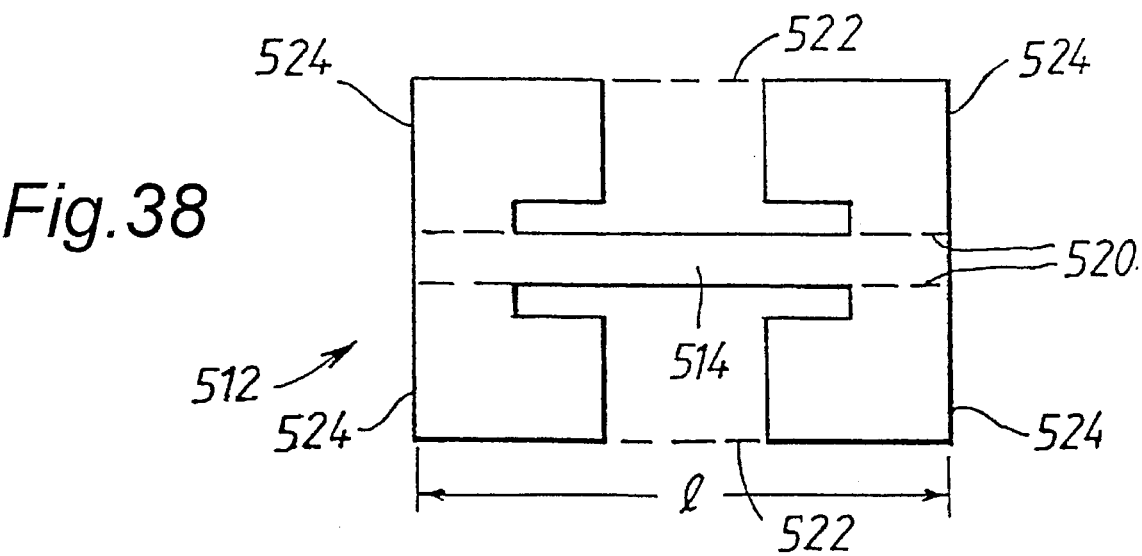

FIG. 38 shows a further modified magnetostrictive element 512 similar to that described with reference to FIGS. 36 and 37 and accordingly corresponding reference numbers are used to indicate corresponding items. In FIG. 38 lateral projections 524 are provided on the strip 514 instead of the projections 516 and 518 of FIGS. 36 and 37. Each projection 524 is of generally L-shape and the projections thus form E-shapes with the strip 514. Apart from the shape of the projections 524, the description given with reference to FIGS. 36 and 37 also applies to FIG. 38. As a specific example of frequencies obtainable with a device as shown in FIG. 38, i might have a value of 5 mm which, in the absence of the projections 524, would mean that the strip 514 would have a fundamental frequency of 440 KHz. The mass of the elements 524 might be such as to reduce this frequency to a lower value of say 113 KHz and, in an experimental set up, it has been found that a hard magnetic element having a width slightly greater than that indicated by dotted lines 520 and producing a biasing field to induce resonance of the strip 514 at its fundamental frequency will produce an additional unwanted resonance at a higher frequency (in the experiment this was found to be 223 KHz), in response, of course, to an interrogating field of the relevant frequencies. This unwanted frequency will be taken into account in designing any practical system.

Elements with side projections such as those shown in FIGS. 36 to 38 to provide different natural frequencies whilst maintaining the length l constant may accordingly be used instead of the elements of different length shown in FIG. 14.

Figure 26:
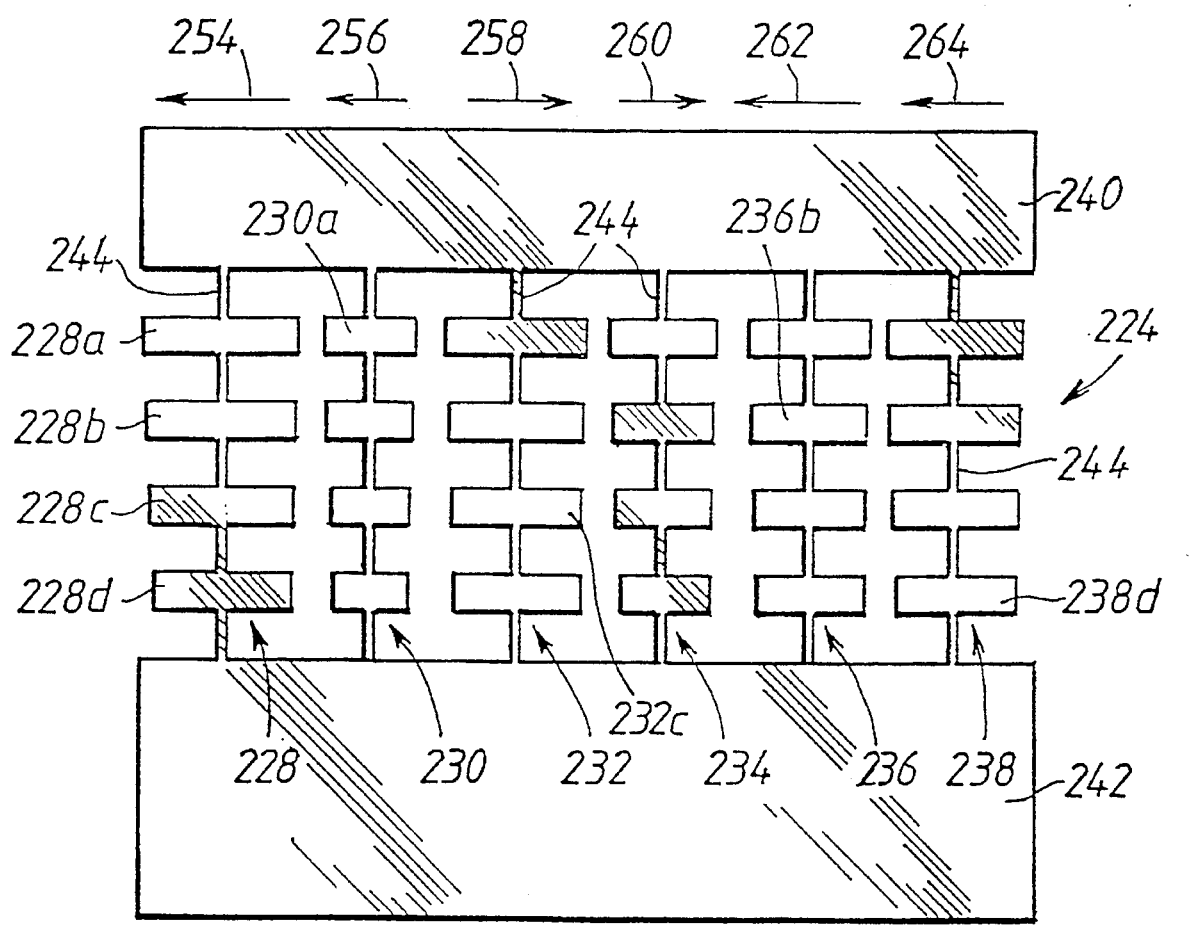
FIG. 26 shows in more detail an array of magnetostrictive elements utilized in the embodiment of FIGS. 23 to 25.
Figure 39:
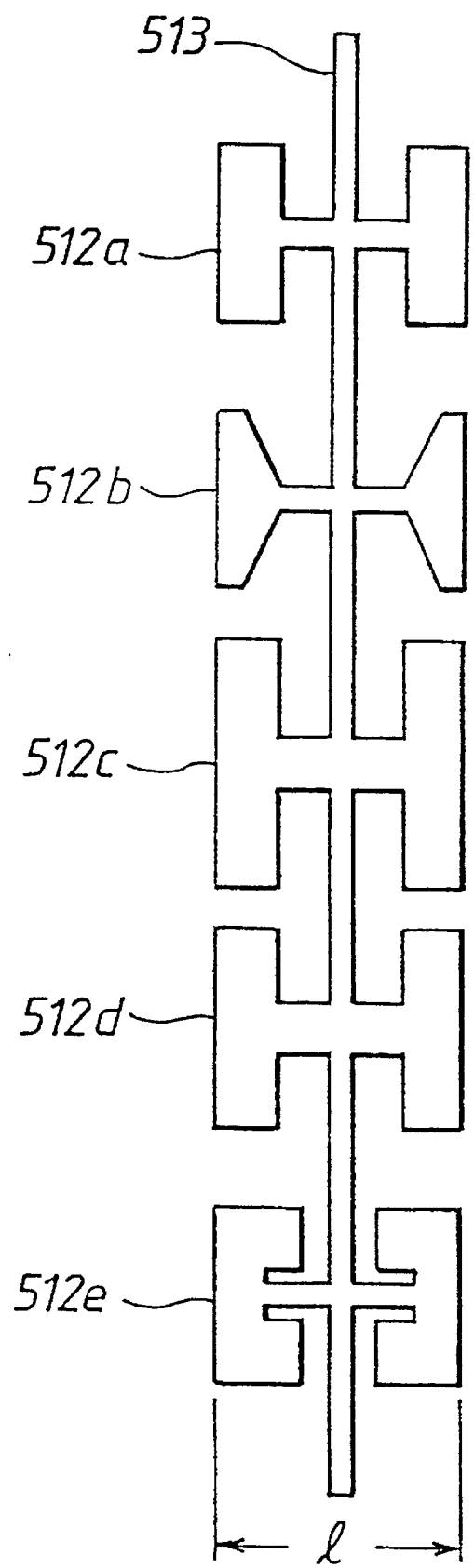
FIG. 39 is a diagram showing a set of magnetostricitive elements similar to those illustrated in FIGS. 36 to 38 but formed from a unitary piece of material.

Similarly elements of the shapes illustrated in FIGS. 36 to 38 may be employed for providing elements of different natural frequency in an array similar to that shown in FIG. 26 instead of providing elements of differing lengths. FIG. 39 illustrates part of such an array in which, as shown, five elements 512a to 512e are formed from a common piece of material and remain connected by a support strip 513. All elements have the same length l but, with their various projections, are otherwise of different shapes and sizes to provide different natural frequencies. Thus, an array comprising elements similar to those shown in FIG. 39 may be used in the embodiment of FIG. 23 in place of the array shown in FIG. 26.

Figure 40:
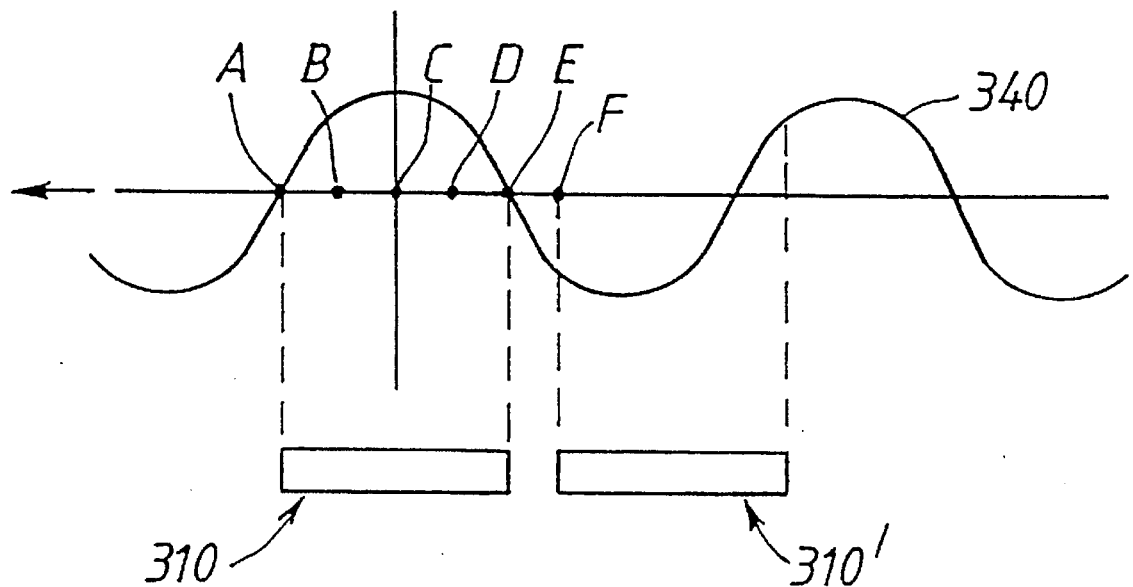
FIG. 40 diagrammatically illustrates a modification to the embodiment shown in FIG. 30.

FIG. 40 illustrates a modification to the linear encoder shown in FIG. 30. As shown in FIG. 40, in addition to the resonator 310 which cooperates with the track 314, a further similar resonator 310' is provided also cooperating with the track 314. If the resonators 310 and 310' are to be excited simultaneously they should have different natural frequencies so that their resonances are distinguishable. This can be achieved by making them of slightly different lengths but preferably they have the same length as each other in which case the difference in natural frequencies can be achieved in the manner described with reference to FIGS. 36 to 38 or otherwise adding mass to one or both of the resonators. The resonator 310' is longitudinally offset relative to the resonator 310 so that when the end of the resonator 310 is coincident with an zero crossing point of the signal 340, the end of resonator 310' is part-way between a minimum of the curve 310 and the next zero crossing point. Thus, FIG. 40 illustrates the resonators 310 and 310' longitudinally aligned with each other and spaced from each other although of course other positions are possible provided the appropriate "phase" difference with respect to the recorded signal 340 is maintained.

The letters A, B, C, D, E and F marked on the horizontal axis upon which curve 340 is drawn in FIG. 40 indicate examples of six positions of the end of resonator 310 relative to the recorded signal 340 as the track 314 is moved therepast, positions A and E being zero crossing points and position C being a maximum point. The waveforms in the lower part of FIG. 40 show the resonances which will be produced in the resonators 310 and 310' (in response to interrogating fields of appropriate frequency) when the track is in the positions A to F respectively. Since the manner in which the resonance changes as the track 314 moves past the resonator 310 has already been described with reference to FIGS. 31 and 33, it is believed that FIG. 40 will be readily understood without further description.

The purpose of the additional resonator 310' illustrated in FIG. 40 is to extend the distance through which the track 314 must move before the resonances begin to repeat, the position of the resonantors 310, 310' relative to the track 314 thus being unambiguous through points A to E. As will be appreciated, instead of the simple sinewave signal 340 shown in FIG. 40, composite signals may also be used on the track 314.

Figure 41:
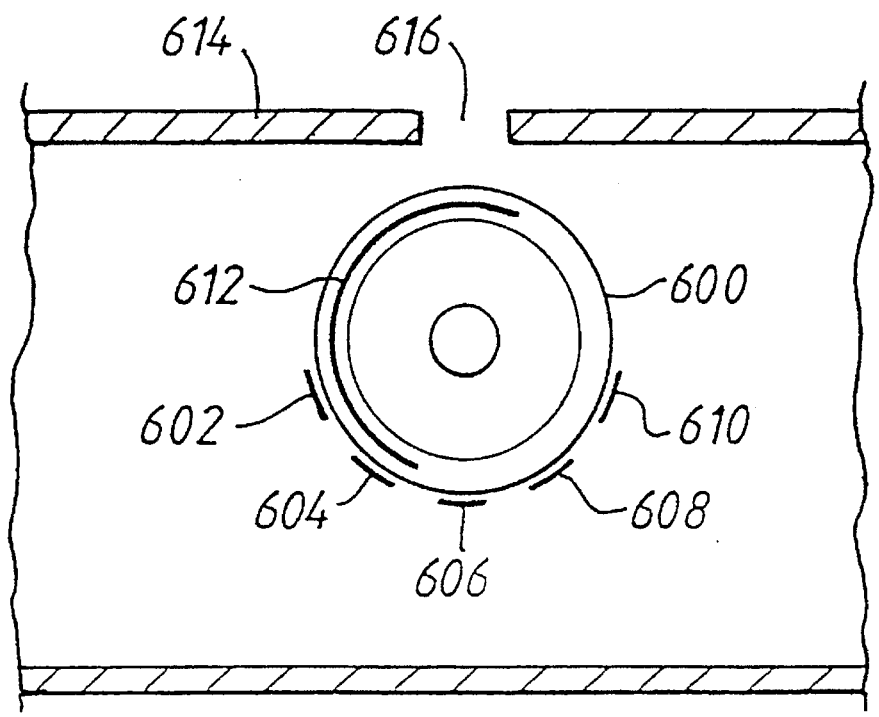
FIG. 41 diagrammatically shows a modification to the embodiment of FIGS. 23 to 27.

FIG. 41 illustrates a modification to the embodiments of FIGS. 23 to 29 in which five magnetostrictive resonators are associated with each dial instead of four and each dial carries a hard magnetic biasing element extending over five contiguous digit positions of the dial i.e. half-way round the circumferance. Thus, FIG. 41 diagrammatically illustrates one of the dials indicated by reference number 600, five magnetostrictive resonators 602, 604, 606, 608 and 610 each having a different natural frequency from the others and spaced from each other so as to be opposite respective different digit positions. Hard magnetic biasing element 612 extending half-way round the dial 600 is also diagrammatically illustrated. The dial 600 may, be similar to the dials illustrated in FIGS. 23 to 29 and the magnetostrictive elements 602 to 610 and the hard magnetic element 612 may be mounted in a manner similar to the corresponding elements in those figures. Similarly, the dial 600 may be positioned in a casing 614 having a viewing window 616 through which the numbers of the periphery of the dial are visible.

If the hard magnetic material 612 extends over digit position zero to four inclusive, the sequence of codes for the successive dial positions may be as set out below in Table 3.

TABLE 3

| Dial number | a | b | c | d | e |
|---|---|---|---|---|---|
| 0 | 0 | 0 | 0 | 1 | 1 |
| 1 | 0 | 0 | 0 | 0 | 1 |
| 2 | 0 | 0 | 0 | 0 | 0 |
| 3 | 1 | 0 | 0 | 0 | 0 |
| 4 | 1 | 1 | 0 | 0 | 0 |
| 5 | 1 | 1 | 1 | 0 | 0 |
| 6 | 1 | 1 | 1 | 1 | 0 |
| 7 | 1 | 1 | 1 | 1 | 1 |
| 8 | 0 | 1 | 1 | 1 | 1 |
| 9 | 0 | 0 | 1 | 1 | 1 |

In the above Table, the columns headed a to e represent respectively the response of the magnetostrictive elements 602 to 610, with a "0" indicating that the element is not biased to resonate and a "1" indicating that it is biased to resonate in response to an interrogating field of appropriate frequency.

Figure 42:
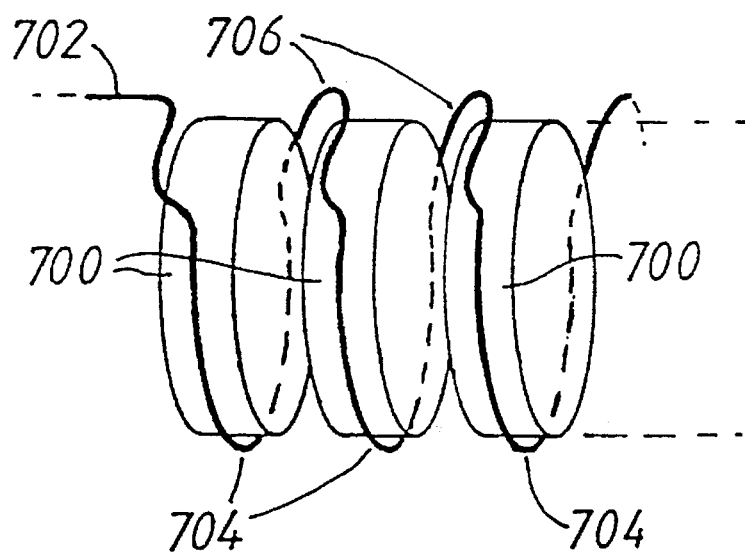
FIG. 42 is a diagrammatic perspective view illustrating a modification which may be made to the embodiments of FIGS. 16 to 29.

FIG. 42 shows a further possibility for the mounting of the interrogating coil for interrogating the positions of the dials in, for example, the embodiment of FIG. 23. Thus, in FIG. 42, reference 700 indicates three of the dials included in the meter and reference 702 indicates an interrogating coil (without showing any mounting means therefor) wound coaxial with the dials 700. As can be seen, the lower portions of the coil 704 extend round the dials 700 whereas the upper portions 706 are offset this being to avoid interfering with the visibilty of the numbers on the perifery of the dials. Although coil 702 is shown as a single strand in FIG. 42 in practice it may comprise a number of windings. Energization of the interrogating coil 702 may be effected in any of the various way described herein in relation to other interrogating coils. As will be appreciated, although the resonators are not shown in FIG. 42, these will be positioned between the portions 704 of coil 702 and the dials 700.

FIGS. 43 to 46 illustrate diagrammatically means by which the response of the magnetostrictive element to the interrogating field may be enhanced, such means operating by causing the flux in the interrogating field to be concentrated in the region containing the magnetostrictive element. Such means may be applied, with appropriate structure, to any of the magnetostrictive elements referred to above where, in a given application, there is sufficient space for doing so. For illustrative purposes, however, the response enhancing means will be described with reference to FIGS. 43 and 44 as applied to an indentification element such as element 280 illustrated in FIG. 23 but in which the identification element includes a number of magnetostrictive resonators having different fundamental frequencies and biased to resonate at various harmonics whereby a multi-digit number indicative of the identity of the meter may be encoded.

Figure 43:
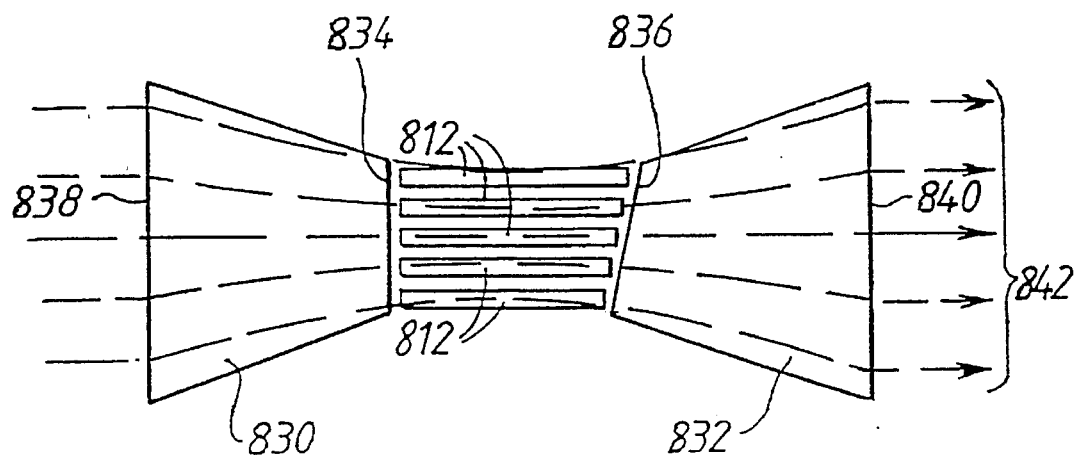
FIG. 43 is a diagrammatic plan view illustrating a modification whereby the response of the magnetostrictive resonant elements to an interrogating field may be enhanced.
Figure 44:
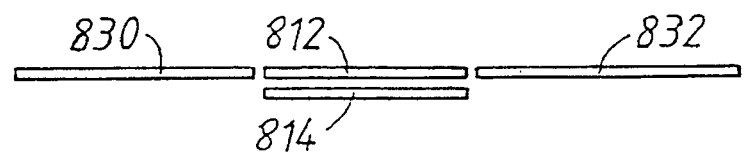
FIG. 44 is a diagrammatic side view of the modification of FIG. 43.

Thus, FIGS. 43 and 44 show a set of five magnetostrictive resonator elements 812 each having an associated hard magnetic biasing element 814 positioned between planar soft magnetic sheets of high permiability 830 and 832 of trapezoidal shape. As can be seen in FIG. 44, the sheets 830 and 832 are in the same plane as the elements 812. The narrow ends 834 and 836 of the sheets 830 and 832 respectively are positioned adjacent the ends of the elements 812 and the wide ends 838 and 840 of the sheets 830 and 832 respectively are accordingly spaced from the elements 812. As seen in FIG. 43, the sheets 830 and 832 are of different shape from each other so that the edges which are adjacent the ends of the elements 812 are located as closely as possible thereto. The effect of this arrangement is to concentrate the magnetic flux of the interrogating field in the region between the narrow ends 834 and 836 of the sheets 830 and 832, that is to say in the region containing the magnetostrictive elements 812. This effect is shown by dotted lines 842 in FIG. 43, representing the flux lines of the interrogating field. As a result of this, the sensitivity of the magnetostrictive elements to the applied field is increased. Thus, the range of operation is increased for a given power level. Alternatively, this arrangement will allow lower power levels to be used for the interrogating field if the range is maintained or, as a further alternative, if both range and power levels are maintained, enhanced signal to noise ratio will be achieved.

A suitable magnetic material for the sheets 830 and 832 is Vacuumschmelze 6025.

Figure 45:
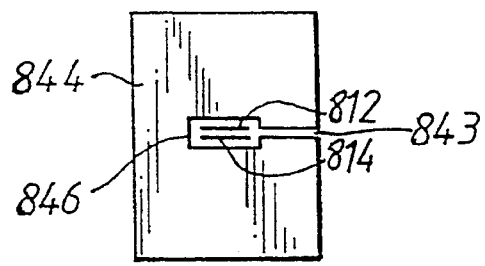
FIG. 45 is a diagrammatic plan view showing a further modification whereby the response of the magnetostrictive resonant element to an interrogating field may be enhanced.
Figure 46:
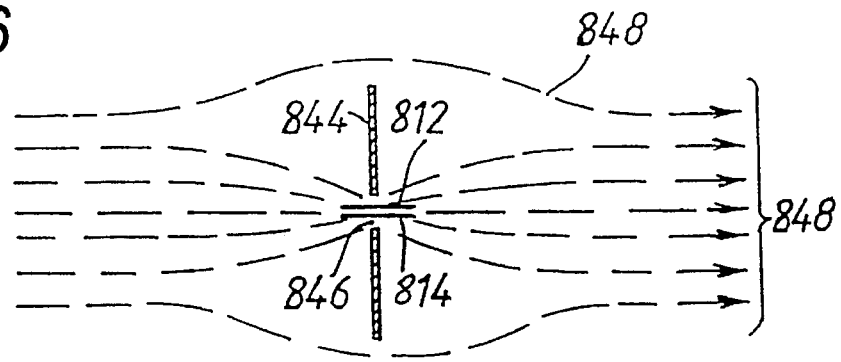
FIG. 46 is a diagrammatic side view of the modification of FIG. 45.

FIGS. 45 and 46 show an alternative arrangement for concentrating the flux of the interrogating field in the region containing the magnetostrictive element 812. In this case, only a single magnetostrictive element 812 is shown in the drawings, although of course a set of such element may be provided if desired. In FIGS. 45 and 46, a rectangular sheet 844 of non-magnetic material, such as aluminium, has an aperture 846 in which the element or elements 812 and 814 are located, with the sheet 844 extending generally perpendicularly to the elements 812 and 814 and positioned at about the centre thereof. A narrow gap 843 extending from the aperture 846 to the edge of the member 844 ensures that there is no short circuit path extending all the way around the gap 846. As represented by broken lines 848 in FIG. 46, the lines of flux of the interrogating magnetic field pass around the sheet 844 and through the aperture 846 therein, those passing through the aperture 846 thus being concentrated in the manner shown and thus enhancing the strength of the interrogating field in the region of the opening 846 where the magnetostrictive element 812 is located. To be effective, the sheet 844 should have a thickness at least as great as the electromagnetic skin depth. Optimally, therefore, the thickness is slightly greater than this depth so as to achieve the required result without wasting material.

In the embodiments so far described, the magnetic field patterns provided in the hard magnetic element have been such as to bias the magnetostrictive elements to resonate longitudinally. That is to say the rectangular magnetostrictive strips stretch and contract in the longitudinal direction in response to the applied interrogating alternating field of appropriate frequency. It is possible, however, within the scope of the invention to provide biasing fields which cause non-longitudinal modes of vibration. Two examples will be described with reference to FIGS. 47 to 52.

With reference to FIG. 47, a magnetostrictive element 912 is biased by a hard magnetic biasing element (not shown) in such a manner that the fields in the upper and lower parts of the strip element 912 are directed in opposite longitudinal directions as shown by arrows 914 and 916. FIG. 48 shows at Aa and Ab respectively the signals recorded on the biasing element along lines a—a and b—b indicated in FIG. 47. The effect of this magnetic pattern is that, in response to an interrogating field of appropriate frequency, the upper and lower portions of the strip 912 as shown in FIG. 47 will extend and contract in anti-phase to each other producing flexural vibrations of the strip in its own plane as shown in chain dotted lines in FIG. 49. The frequency at which these oscillations occur will differ from the fundamental frequency of the element 912. In order to produce other vibrational modes at other frequencies, other signal patterns may in practice be superimposed on those shown on FIG. 48, for example for causing the element 912 to vibrate longitudinally at harmonics of its fundamental frequency in the manner described with reference to FIGS. 1 to 9.

In the embodiment of FIG. 50, a magnetostrictive strip element 918 is biased by a hard magnetic element (not shown) producing a field transverse to the length of the strip as shown by arrows 922. The strength of the field represented by arrows 922 is greatest at the ends of the strip and decreases towards the centre of the strip at which region the field is substantially zero. Thus, FIG. 51 illustrates at Ba, Bb and Bc the signals recorded on the magnetic biasing element along the lines aa, bb and cc respectively as marked on FIG. 50. It should be understood that the horizontal axis in the graphs of FIG. 51 represents the signal recorded in a direction transverse to rather than longitudinally of the strip 922. The effect of this magnetic field pattern is to produce transverse vibrational distortion of the strip in a manner somewhat as shown in FIG. 52 where, essentially, the ends of the strip are splayed transversely in response to an interrogating alternating field of appropriate frequency. As will be seen in FIG. 52, there is some apparent contraction in the width of the strip in the intermediate zones bb and cc. This has been predicted by a computer simulation of the vibration that would be produced by the patterns shown in FIGS. 50 and 51. The frequency of the signal necessary to produce the oscillations shown in FIG. 52 will be different from the fundamental frequency of the strip. As with the other embodiments, other field patterns may be superimposed on those shown in FIGS. 50 and 51 so as to arm the strip for resonants at other frequencies, such as its fundamental frequency and/or harmonics thereof.

Thus, the embodiments of FIGS. 47 to 52 are illustrative of the principle that, in accordance with the invention, vibration in different modes may be induced in the strip to provide additional frequencies to which the strip will respond.

Many further modifications are possible within the scope of the invention. For example, instead of the arrangement shown in FIG. 15, meter reading could be achieved by placing the reading device close to the meter. However, the provision of the coils 130 and 132 as shown in FIG. 15 makes it possible, for example, for the meter to be located inside a house or underground and reading to take place from a few meters away.

In another modification, a single magnetic biasing member could be positioned next to the or each dial and magnetostrictive elements could be mounted on the dial at positions corresponding to the numbers thereof so as to be biased to resonate at their natural frequencies when positioned next to the biasing element. The magnetostrictive elements would be mounted in cavities slightly larger than the elements so that the elements are free to vibrate. Magnetostrictive strips having different natural frequencies would be associated with the different numbers so that the numbers can be distinguished from each other. Where the relative position of two linearly moveable members is to be detected, a row of magnetostrictive elements could be provided along one of the members, each element being adapted to resonate at a different fundamental frequency, and a hard magnetic biasing element would be provided on the other element so as to move along the row of magnetostrictive elements and bias different ones thereof as the two members linearly move relative to each other.

It would also be possible to construct a device in accordance with the invention for indicating the value of a variable without any moving parts. Electrical means could be provided for producing different magnetic patterns as by energising a set of electromagnetic coils as a function of the value of the variable and a magnetostrictive element or elements biased by said magnetic pattern could be arranged to resonate at different frequencies according to the magnetic biasing pattern produced. Thus, the different frequencies or combinations of frequencies would be indicative of the value of the variable.

Although the members 124 in the embodiment of FIG. 10 have been described as separate hard magnetic strips, it would alternatively be possible to provide a single hard magnetic coating on the surface of each drum so that the "strips" would not be physically separate but would merely be zones with differing magnetic patterns recorded in them. This also applies to the elements 124' and 124" of the other embodiments.

Although in the embodiments of FIGS. 23 to 29, the array 24 of magnetostrictive elements has been described as being formed by etching a single sheet of magnetostrictive material, such an array could be made in other ways. For example, the magnetostrictive elements could be individually made and attached to a magnetically transparent supporting sheet such as a sheet of plastics material (for example Mylar) which would be mounted adjacent the dials in a manner similar to the array 224. Further, although only two hard magnetic elements 226a and 226b have been shown in the embodiments of FIGS. 24 to 29, each extending over a number of digit positions, it would be possible instead to utilize a separate hard magnetic element for each of the digit positions which is to have a hard magnetic element associated therewith.

Although in the description with reference to the drawings, the magnetostrictive strips have been biased in only one direction, i.e. along their length, it would also be possible to bias them transversely by appropriate field patterns so that they will be caused to resonate in the transverse direction instead of or in addition to resonance in the longitudinal direction.

Although, in the above description, there have been various references to causing the interrogating field to be swept or stepped through the required range of frequencies, other alternatives are possible. For example, the interrogating field could comprise a burst of the required interrogating frequencies generated simultaneously or, in some situations, could be in the form of a burst of noise, such as white noise, containing a large number of frequencies in addition to those required for causing resonance.

In the embodiment of FIG. 30, it would be possible to omit the track 314 and transducer 310 where only a coarse indication of absolute position is needed. Alternatively, the track 312 and transducer 308 could be omitted and reliance place upon the high resolution track 314. In that case, where an absolute indication of position of the member 300 is needed, rather than merely a measure of incremental movements thereof, an appropriate alternative means for giving this information could be provided, for example as by moving the member 300 to one end position and then keeping a count of incremental movements therefrom.

It has been described with reference to FIGS. 36 to 39 that the provision of projections at the ends of the strip reduces the fundamental frequency of the strip. Alternative ways of reducing fundamental frequency are possible, in particular by adding mass in some other way such as by depositing massy material at appropriate positions.

Although with reference to FIGS. 37 to 52, it has been indicated that the magnetostrictive element may be biased to resonate in different modes or directions, in many applications it will be desired to ensure that resonance in only the longitudinal mode is achieved. In such applications, a simple rectangular strip of magnetostrictive material may be used with a high aspect ratio i.e. the strip is long and thin so that longituninal vibration is maximized and transverse vibration minimized. For a constant length of strip, reducing the width reduces the total signal because the amount of material is reduced but improves the signal to noise ratio because the resonance produced has a substantially narrower frequency band. If the length of the resonator is an integer multiple of its width then difficulties may arise in using certain harmonics. For example, in experimentation with devices having a 3:1 aspect ratio, the third harmonic (i.e. a frequency three times the fundamental) was not usable because it was split into a doublet. A similar effect occurred at the ninth harmonic with this arrangement. Further, the resonant frequencies were not exact multiples of the fundamental where low aspect ratio is used and this is believed to be due to the excitation of resonances transverse to the strip. These problems may be avoided by using high aspect ratio strips, for example an aspect ratio of 15:1 or more, since the problems under discussion will then only arise at very high harmonics (frequencies of 15 times the fundamental or higher where the aspect ratio is 15:1), which would be outside the range of frequencies used.

It has been described above with reference to FIGS. 3 to 9 that the signal source 20 is preferably turned on before the element 14 reaches the transducer 18 and is turned off after the element 14 has passed for the purpose of avoiding transients. In many situations, however, this will not be necessary since careful design of the system can avoid the occurrence of unwanted transients.

The invention has a number of advantages. It permits the remote reading of variable data such as that provided by the dials of water and gas meters by means which are compatible with the existing configurations of such devices and which permit the data to be read in the ordinary way without interference with visibility. The invention has the further advantages of low cost, intrinsic safety and ruggedness and it imposes no mechanical drag of moving parts. Being passive, it has a long working life without maintenance or replacement of parts.

We claim:

1. Measuring apparatus for generating a multidigit representation of a value of a variable, said apparatus comprising:
   a plurality of movable members, each corresponding to a respective one of said digits and movable to different positions in response to variation in the value of said variable so that the positions of said members are indicative of the values of said digits;
   a plurality of magnetic field generators associated respectively with said respective movable members, each said generator generating an alternating magnetic field having a parameter which varies as a function of the position of the respective movable member, said alternating fields being at different frequencies from each other such as to be distinguishable from each other;
   an exciting signal generator coupled in common to said magnetic field generators for applying thereto exciting signals at said different respective frequencies; and
   an output signal generator coupled in common to said magnetic field generators for producing a plurality of output signals, each corresponding to a respective one of said generated alternating magnetic fields and each having a value dependent upon the value of said varying parameter of the corresponding alternating magnetic field.

2. Measuring apparatus according to claim 1, wherein said movable members rotate to different angular positions in response to variation in the value of said variable.

3. Measuring apparatus according to claim 1, wherein each alternating magnetic field has an amplitude, and wherein said parameter is the amplitude.

4. Measuring apparatus according to claim 1, wherein each alternating magnetic field has a frequency, and wherein said parameter is the frequency.

5. Measuring apparatus according to claim 1, wherein each magnetic field generator comprises a magnetostrictive element and a bias element for biasing said magnetostrictive element to resonate when subjected to said exciting signals.

6. Measuring apparatus according to claim 1, wherein said common exciting signal generator and said common output signal generator are formed as a single coil.

7. Measuring apparatus according to claim 1, wherein said plurality of movable members and said plurality of magnetic field generators are provided in a first unit and said common exciting signal generator and said common output signal generator are provided in a second unit, said first and second units being separate.

8. Measuring apparatus according to claim 3, wherein said amplitude varies in an analog manner as a function of the position of the respective movable member.

9. Measuring apparatus according to claim 3, wherein said amplitude varies in a digital manner as a function of the position of the respective movable member.

10. Measuring apparatus comprising:
    a plurality of measuring members, each being movable in response to variation in a variable to be measured to positions indicative of the variable;
    a plurality of magnetic field generators associated respectively with said respective movable members, each said generator generating an alternating magnetic field, said alternating fields being at different frequencies from each other such as to be distinguishable from each other;
    an exciting signal generator coupled in common to said magnetic field generators and for applying thereto exciting signals at said different respective frequencies; and
    an output signal generator coupled in common to said magnetic field generators for producing a plurality of output signals, each corresponding to a respective one of said generated alternating magnetic fields and each having a value dependent upon the position of the corresponding measuring member.

11. Measuring apparatus according to claim 10, wherein said measuring members rotate to different angular positions in response to variation in the value of said variable.

12. Measuring apparatus according to claim 10, wherein each magnetic field generator comprises a magnetostrictive element and a bias element for biasing said magnetostrictive element to resonate when subjected to said exciting signals.

13. Measuring apparatus according to claim 10, wherein said common exciting signal generator and said common output signal generator are formed as a single coil.

14. Measuring apparatus according to claim 10, wherein said plurality of measuring members and said plurality of magnetic field generators are provided in a first unit and said common exciting signal generator and said common output signal generator are provided in a second unit, said first and second units being separate.

* * * * *

UNITED STATES PATENT AND TRADEMARK OFFICE
CERTIFICATE OF CORRECTION

PATENT NO. : 5,621,316
DATED : April 15, 1997
INVENTOR(S) : Andrew N. Dames et al It is certified that error appears in the above-indentified patent and that said Letters Patent is hereby corrected as shown below:

On the cover sheet under heading [56] References Cited, insert the following U.S. Patent documents:

| | | |
|---|---|---|
| Re. 26,774 | 1/1970 | Tellerman |
| 4,071,818 | 1/1978 | Krisst |
| 4,510,489 | 4/1985 | Anderson, III et al |
| 4,510,490 | 4/1985 | Anderson, III et al |
| 4,647,917 | 3/1987 | Anderson, III et al |
| 4,710,709 | 12/1987 | Anderson, III et al |

Signed and Sealed this

Eighth Day of July, 1997

*Attest:*

BRUCE LEHMAN

*Attesting Officer*      *Commissioner of Patents and Trademarks*